(12) United States Patent
Hasegawa et al.

(10) Patent No.: US 11,294,223 B2
(45) Date of Patent: Apr. 5, 2022

(54) LIGHTING DEVICE

(71) Applicant: Japan Display Inc., Tokyo (JP)

(72) Inventors: Makoto Hasegawa, Tokyo (JP);
Nobuyuki Suzuki, Tokyo (JP);
Masafumi Okada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/218,613

(22) Filed: Mar. 31, 2021

(65) Prior Publication Data

US 2021/0318575 A1    Oct. 14, 2021

(30) Foreign Application Priority Data

Apr. 10, 2020   (JP) .............................. JP2020-070754

(51) Int. Cl.
*G02F 1/1335* (2006.01)
*G02F 1/03* (2006.01)
*G02F 1/137* (2006.01)

(52) U.S. Cl.
CPC ...... *G02F 1/133526* (2013.01); *G02F 1/0316* (2013.01); *G02F 1/137* (2013.01)

(58) Field of Classification Search
CPC ................................................ G02F 1/133526
See application file for complete search history.

(56) References Cited

U.S. PATENT DOCUMENTS

| | | | | |
|---|---|---|---|---|
| 2010/0079980 A1* | 4/2010 | Sakai | ................... | G02B 6/0016 362/97.1 |
| 2011/0149594 A1* | 6/2011 | Terajima | .............. | G02B 6/0021 362/606 |
| 2011/0194034 A1* | 8/2011 | Shimizu | ............... | G02B 6/0073 348/739 |
| 2014/0321153 A1* | 10/2014 | Chen | ..................... | G02B 6/0031 362/606 |
| 2016/0054510 A1* | 2/2016 | Okimoto | .............. | G02B 6/0073 349/64 |
| 2016/0077402 A1* | 3/2016 | Takehara | .......... | G02F 1/134309 349/33 |
| 2018/0329262 A1* | 11/2018 | Yata | .......................... | G02F 1/29 |
| 2019/0025657 A1 | 1/2019 | Presniakov et al. | | |

FOREIGN PATENT DOCUMENTS

| | | |
|---|---|---|
| JP | 2012-069409 A | 4/2012 |
| JP | 2019-169435 A | 10/2019 |

* cited by examiner

*Primary Examiner* — Edmond C Lau
(74) *Attorney, Agent, or Firm* — Oblon, McClelland, Maier & Neustadt, L.L.P.

(57) ABSTRACT

The purpose of the present invention is to realize a lighting device of thin, low power consumption and small light distribution angle. The present invention takes the following structure to realize the above task:

A lighting device comprising:

a disc shaped light guide, having a main surface and a rear surface, including a first hole at a center, a disc shaped reflection sheet, disposed at the rear surface side of the light guide, including a second hole at a center, a prism sheet, disposed at the main surface side of the light guide, including a concentric first prism array, wherein a reflection mirror is set in the first hole of the light guide at the side near to the prism sheet, an LED is set opposing to the reflection mirror.

14 Claims, 31 Drawing Sheets

B–B

B-B

C-C

D-D

E-E

F-F

V1 > V2 > V3 > V4

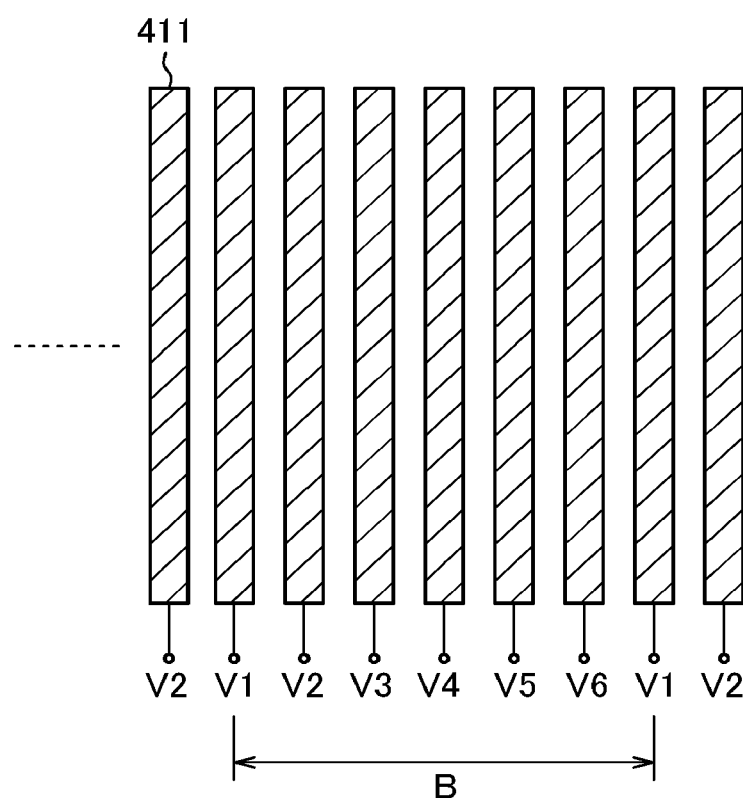

K-K

V5 > V4 > V3 > V2 > V1

K-K

LIGHTING DEVICE

The present application claims priority from Japanese Patent Application JP 2020-070754 filed on Apr. 10, 2020, the content of which is hereby incorporated by reference into this application.

BACKGROUND OF THE INVENTION

(1) Field of the Invention

The present invention relates to the lighting device of thin, small light distribution angle, and less power consumption.

(2) Description of the Related Art

Light emitting diodes (LEDs) are being used for the lighting device. Light emitting diodes have high luminous efficiency, and thus profitable for low power consumption. The light emitting diode, however, is a point light source; it must be transformed to the surface light source if it is used as a lighting device. Besides, if it is used as a spot light, a light distribution angle characteristics must be considered.

Patent document 1 discloses a lighting device, which uses a light emitting diode as the light source and to put a collimator lens surrounding the light emitting diode to collimate the emitting light. Patent document 1 further discloses to dispose a liquid crystal lens at the light emitting side of the lighting device to control a transmittance, a diffusion, and a deflection of the emitting light.

Patent document 2 discloses a lighting device, which uses a light emitting diode as the light source and to put a condenser lens surrounding the light emitting diode; and further to put an optical device at the emitting side of the lighting device to change the direction of the emitting light. Patent document 2 further discloses to use a liquid crystal lens as an optical device to change the direction of the emitting light.

Patent document 3 discloses to use a liquid crystal lens to control the shape of the light beam.

PRIOR TECHNICAL DOCUMENT

Patent Document

Patent document 1: Japanese patent application laid open No. 2019-169435
Patent document 2: Japanese patent application laid open No. 2012-69049
Patent document 2: US 2019/0025657 A1

SUMMARY OF THE INVENTION

The lighting device needs to have a small light distribution angle when it is used as e.g. a spot light. Conventionally, for such a lighting device, a parabolic mirror has been used to form a parallel light. However, a certain depth is necessary in such a lighting device; therefore, it is difficult to attain a small lighting device or thin lighting device. In the meantime, the lighting devices, disclosed in Patent document 1 and patent document 2, need a lens to collimate the light from the light source; therefore, they need a certain length of optical path, consequently, it is difficult to realize a lighting device of small depth.

In addition, since a light emitting efficiency of the LED decreases when the LED becomes high temperature, it is preferable to be a low heat generating light source, namely, low power consuming light source as a whole. Besides, if heat generation from the light source is less, it becomes not necessary to provide a heat sink and so forth.

The purpose of the present invention is to realize a lighting device of thin, comparatively less power consumption, and small light distribution angle.

The present invention solves the above explained problems; concrete structures are as follows.

(1) A lighting device including:
a disc shaped light guide, having a main surface and a rear surface, including a first hole at a center,
a disc shaped reflection sheet, disposed at the rear surface side of the light guide, including a second hole at a center,
a prism sheet, disposed at the main surface side of the light guide, including a concentric first prism array,
in which a reflection mirror is set in the first hole of the light guide at the side near to the prism sheet,
an LED is set opposing to the reflection mirror.

(2) The lighting device according to (1),
in which a first liquid crystal lens having a circular outer shape is disposed on the prism sheet,
the first liquid crystal lens has plural lenses extending in a first direction and arranged in a second direction.

(3) The lighting device according to (2),
in which a second liquid crystal lens having a circular outer shape is disposed on the first liquid crystal lens,
the second liquid crystal lens has plural lenses extending in a second direction and arranged in a first direction.

(4) The lighting device according to (3),
in which an initial alignment of the liquid crystal molecules in the first liquid crystal lens and the second liquid crystal lens is homogeneous.

(5) The lighting device according to (1),
in which a liquid crystal lens having a circular outer shape is disposed on the prism sheet,
the liquid crystal lens has concentric plural lenses,
the initial alignment of the liquid crystal molecules is homeotropic.

(6) The lighting device according to (1),
in which a liquid crystal lens having a circular outer shape is disposed on the prism sheet,
the liquid crystal lens has a liquid crystal layer between a first substrate and a second substrate,
plural first electrodes formed in concentric are formed on the first substrate,
a disc shaped second electrode is formed in plane on the second substrate,
lens action of the liquid crystal lens is formed by applying different voltages to each of the plural first electrodes,
an intimal alignment of liquid crystal molecules in the liquid crystal layer is homeotropic.

BRIEF DESCRIPTION OF THE DRAWINGS

FIG. 27 is a plan view which shows an example of voltages applied to the first electrodes for lens action of FIG. 26;

DETAILED DESCRIPTION OF THE PREFERRED EMBODIMENTS

Figure 1:
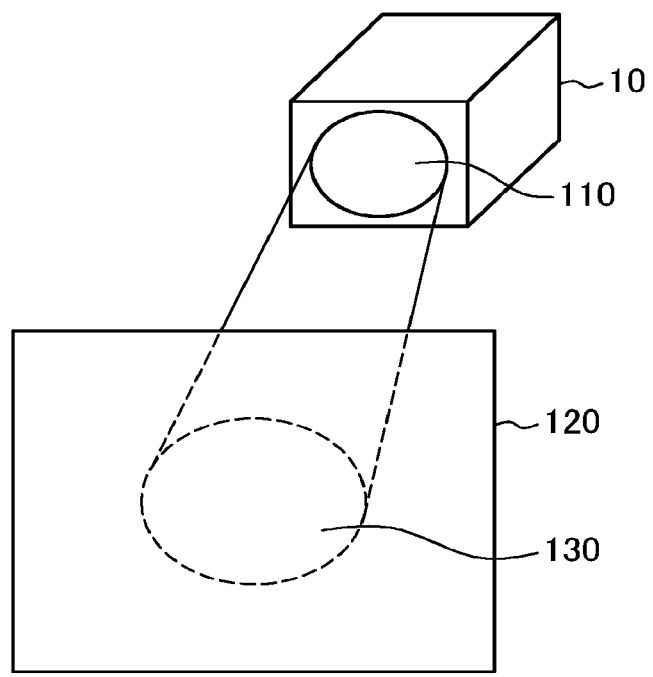
FIG. 1 is a perspective view of the lighting device.

FIG. 1 is an example of the lighting device 10, which is used for a spot light. The light from the lighting device 10 is collimated; a spot light 130 is emitted from the emitting surface 110, and applied to the incident surface 120. The light distribution angle is controlled as e.g. 12 degree to acquire a spot light 130.

Figure 2:
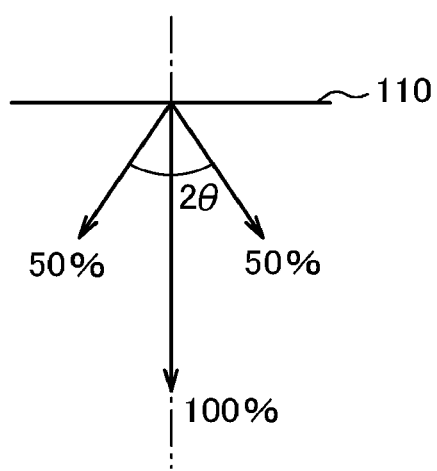
FIG. 2 is a definition of the light distribution angle.

FIG. 2 defines the light distribution angle. FIG. 2 shows e.g. that a spot light is applied to the floor from a light emitting surface 110 disposed on the ceiling. The light intensity is largest at the normal direction to the light emitting surface 110; the light intensity decreases according to the polar angle becomes larger. The light distribution angle is defined as 2θ provided the intensity along the normal direction is 100%, and the intensity along the polar angle θ is 50%. In general collimated light, the light distribution angle is required as 12 degree or less.

Figure 3:
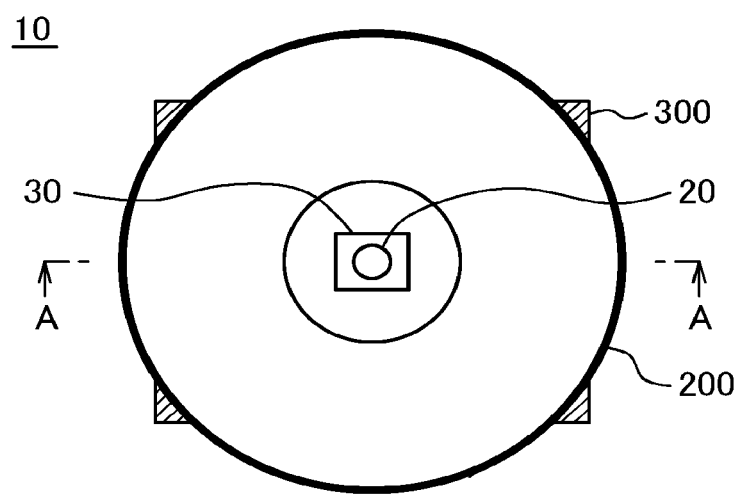
FIG. 3 is a plan view of the lighting device, which collimates light with parabolic mirror.
Figure 4:
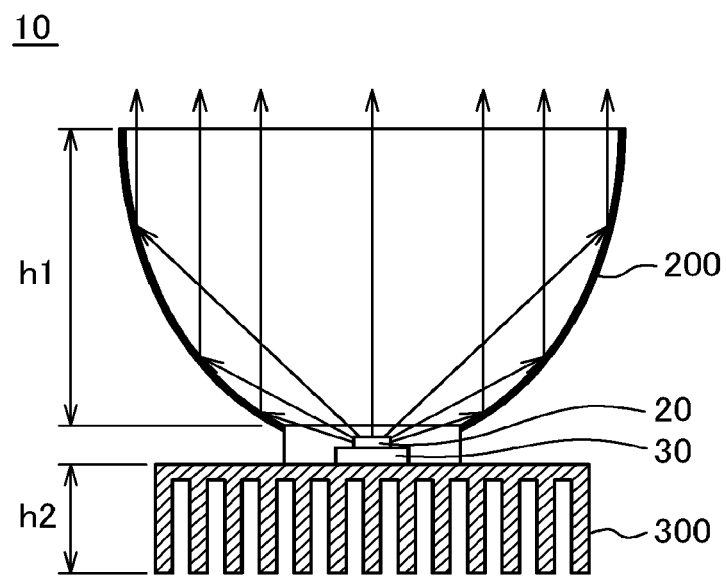
FIG. 4 is a cross sectional view of FIG. 3 along the line A-A.

Conventionally, a parabolic mirror 200 has been used to acquire such a collimated light. FIG. 3 is a plan view of the lighting device using the parabolic mirror 200; FIG. 4 is a cross sectional view of the lighting device of FIG. 3. In FIG. 3, the LED 20 is set at the center of the parabolic mirror 200. The LED 20 is set e.g. on the PCB substrate 30. The LED 20 is a high brightness LED, which becomes high temperature; thus, the LED 20 is set on the heat sink 300. A part of the heat sink 300, which is set at the rear of the parabolic mirror 200, is visible in FIG. 3.

FIG. 4 is a cross sectional view of FIG. 3 along the line A-A. In FIG. 4, the LED 20 is disposed at the bottom surface of the parabolic mirror 200. The lights emitted from the LED 20, except the light emitted in the optical axis direction, reflect at the parabolic mirror and become parallel to the optical axis. The parabolic mirror 200, however, needs to be as high as h1 for enough collimating function. The height h1 of the parabolic mirror 200 needs to be about 60 mm to acquire the light distribution angle of about 12 degree. Actually, since the height h2 of the heat sink 300 is added, the total height of the lighting device becomes 80 mm or more. In the meantime, in the lighting device of FIGS. 3 and 4, one LED, which constitutes the light source, needs to be supplied with a large power; consequently, the heat generation in the LED becomes large, thus, the heat sink is indispensable.

The purpose of the present invention is to realize the lighting device, which can emit collimated light, of thin and comparatively low power consumption. The present invention is explained by the following embodiments.

Embodiment 1

Figure 5:
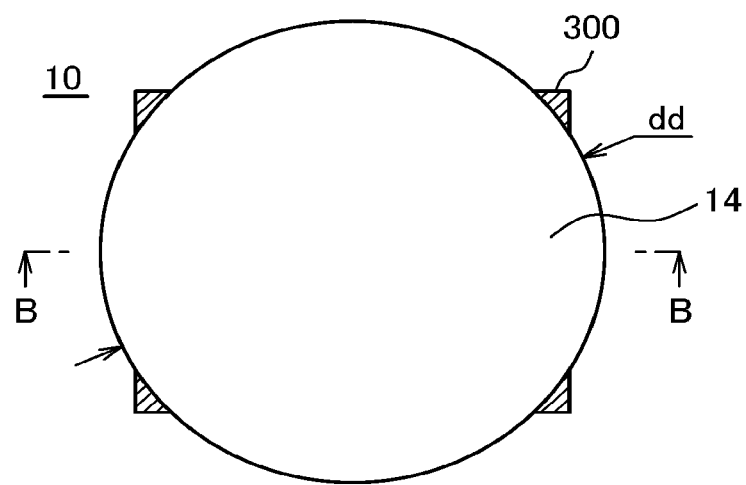
FIG. 5 is a plan view of the lighting device according to embodiment 1.
Figure 6:
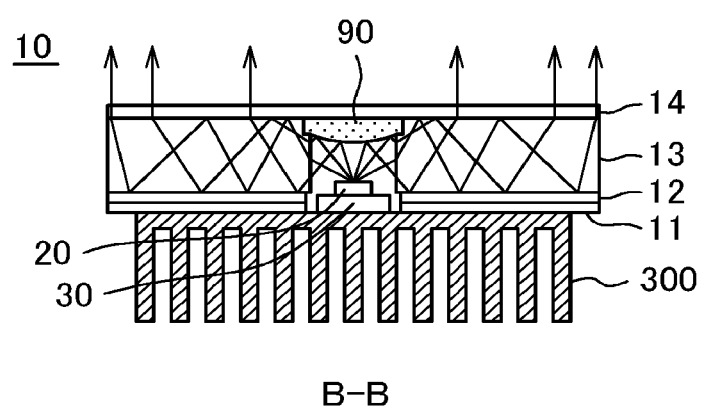
FIG. 6 is a cross sectional view of FIG. 5 along the line B-B.

FIG. 5 is a plan view of the lighting device 10 according to embodiment 1; FIG. 6 is a cross sectional view of FIG. 5 along the line B-B. As depicted in FIG. 5, each of the optical components is disc shaped and a prism sheet 14 is disposed at the upper most surface thereof. A part of the heat sink 300 is visible in FIG. 5; the heat sink 300 is set at the rear of the lighting device to dissipate the heat generated in the LED. The outer dimension dd of the lighting device 10 is e.g. 98 mm.

FIG. 6 is a cross sectional view of FIG. 5 along the line B-B. In FIG. 6, the resin mold 11 having a role of container is set on the heat sink 30 having fins. In FIG. 6, the resin mold 11 looks like a disc; however, it can be formed like a container. A hole is formed at the center of the resin mold 11; and, in a plan view, the LED 20 is set in this hole. In FIG. 6, LED 20 is set on the circuit substrate 30, which has wirings. The circuit substrate 30 for the LED 20 is made as thin as possible to conduct the heat generated in the LED 20 to the heat sink 300 efficiently.

In FIG. 6, the reflection sheet 12 is set on the resin mold 11. An ESR (Enhanced Specular Reflector) of 3M, e.g., can be used as the reflection sheet 12; a thickness is e.g. 70 micron. The light guide 13 is set on the reflection sheet 12. A thickness of the lighting device can be made thin as a total by using the light guide 13.

A hole is formed at the center of the light guide 13; the reflection mirror 90 is set in the hole. The LED 20 is set in the hole of the light guide 13 as opposing to the reflection mirror 90. As depicted by arrows in FIG. 6, the light from the LED 20 is reflected at the reflection mirror 90, and enters the light guide 13 from side wall of the hole of the light guide 13. The light entered the light guide 13 repeats reflections in the light guide 13, and eventually enters the prism sheet 14 set on the light guide 13. The prism array formed in concentric circles in the prism sheet 14 concentrates the outgoing light in a normal direction of the prism sheet 14.

Figure 7:
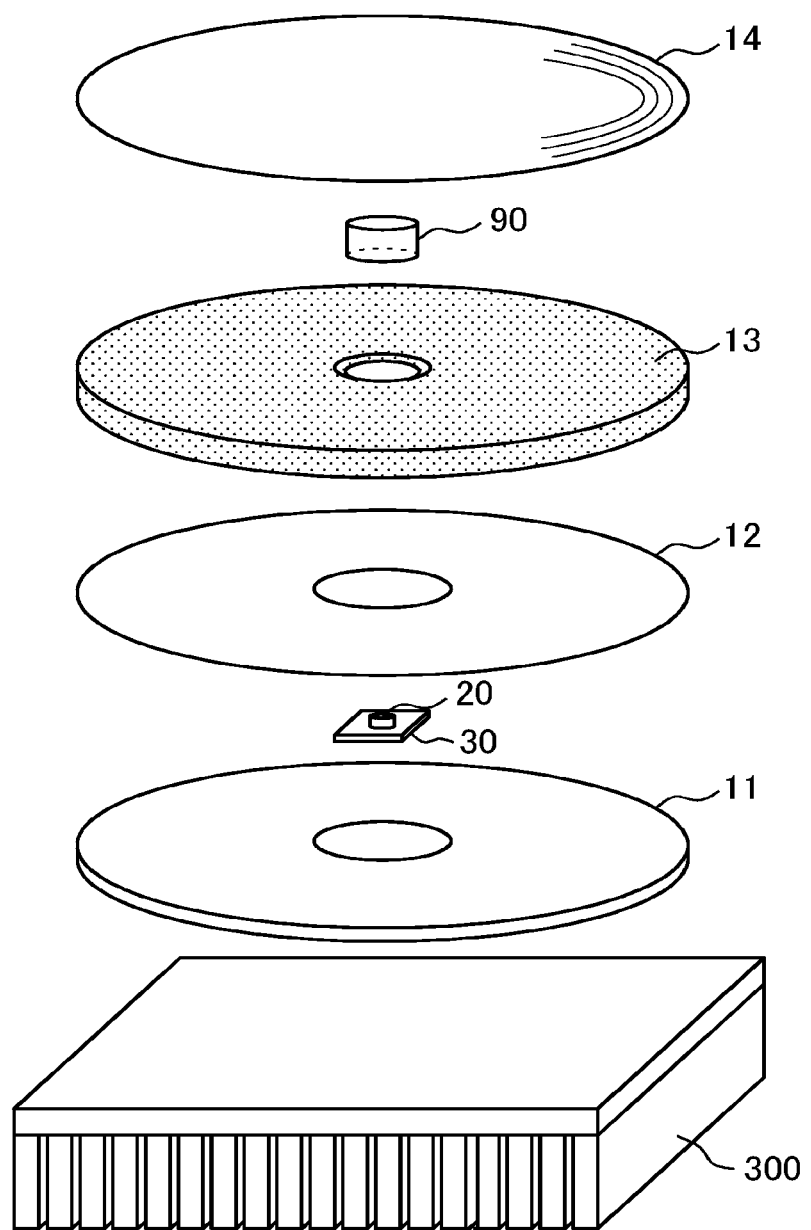
FIG. 7 is an exploded perspective view of the lighting device according to embodiment 1.

FIG. 7 is an exploded perspective view of the lighting device of FIG. 6. In FIG. 7, the resin mold 11 is set on the heat sink 300 having fins. A hole is formed at the center of the resin mold 11, the LED 20 and LED substrate 30 is formed in the hole. Lighting efficiency of the LED 20 decreases when the LED 20 becomes high temperature; therefore, it is necessary to dissipate the heat efficiently through the heat sink 300.

In FIG. 7, the disc shaped reflection sheet 12, which has a hole at the center, is set on the resin mold 11. The disc shaped light guide 13, which has a hole at the center, is set on the reflection sheet 12. A thickness of the lighting device can be made thin as a total by adopting the light guide 13.

The reflection mirror 90 is inserted in the hole, which are set formed at the center of the light guide 13. The prism sheet 14, which has the prism array formed in concentric circles, is set on the light guide 13.

Figure 8:
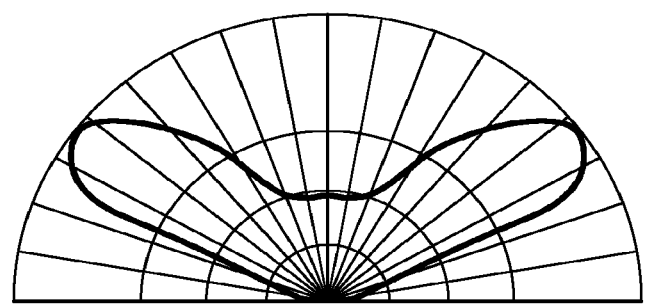
FIG. 8 is a graph that shows a light distribution characteristic of the LED.

FIG. 8 shows light distribution characteristics, which shows a distribution of light intensities emitted from the LED 20. In the coordinate of FIG. 8, the concentric circles show the polar angle; the lines in the radial direction show azimuth. The curve in FIG. 8 shows a distribution of the intensity of the light emitted from the LED 20. As shown in FIG. 8, the light intensity in azimuth 35 degree to 40 degree is strongest. Such distribution is referred to as batwing. A combination of the LED 20, which has a light distribution of FIG. 8, and the reflection mirror 90 efficiently guides the light from the LED 20 into the light guide 13.

Figure 9A:
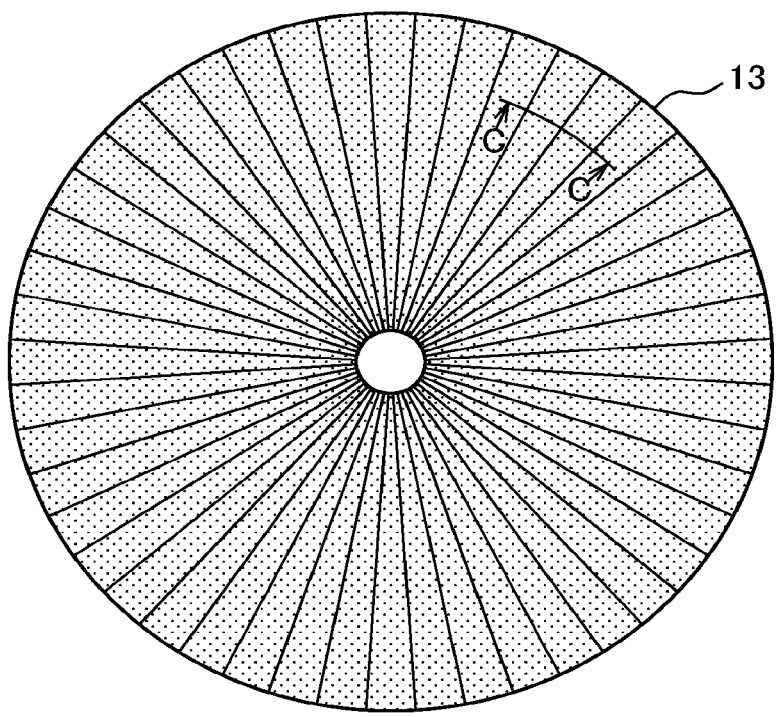
FIG. 9A is a plan view of the light guide.

The prism arrays are formed at the upper surface (may be referred to as the main surface herein after) and the bottom surface (may be referred to as the rear surface herein after) of the light guide 13 to guide the light entered the light guide 13 in upper direction, namely, in the direction to the prism sheet 14. FIG. 9A is a plan view of the light guide 13. A hole is formed at the center of the light guide 13; the refection mirror 90 is inserted in the hole. A prism array, formed in a radial direction, is formed on the upper surface of the light guide 13.

Figure 9B:
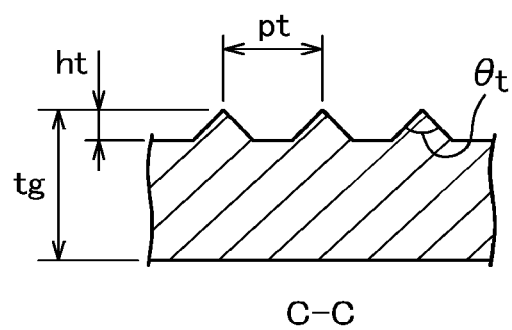
FIG. 9B is a cross sectional view of the prism array on the main surface of the light guide.

FIG. 9B, which is a cross sectional view of FIG. 9A along the line C-C, shows the shape of the prism array at the main surface of the light guide 13. In FIG. 9B, a thickness tg of the light guide 13 is 2 to 3 mm. The prism array on the upper surface of the light guide 13 is formed in radial direction from the center; therefore, the pitch pt changes according to the position. A height ht of the prism array is e.g. 0.1 micron; an apex angle is e.g. 90 degree. In FIG. 9B, the prism array is formed by projections; however, it can be formed by V shaped grooves formed on the upper surface of the light guide 13. In this case, the apex angle of the V shaped groove is e.g. 66 degree.

Figure 10A:
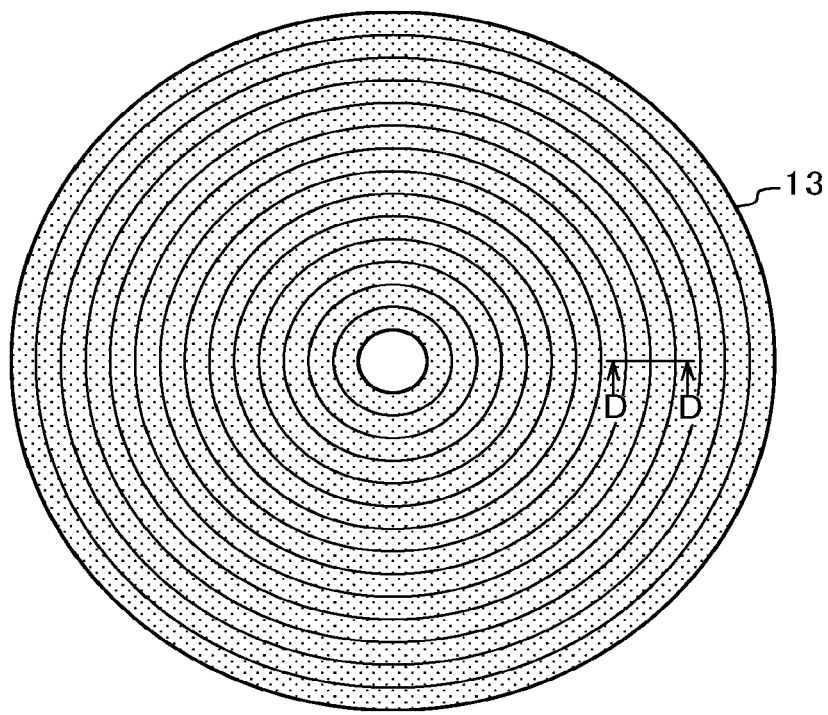
FIG. 10A is a rear view of the light guide.
Figure 10B:
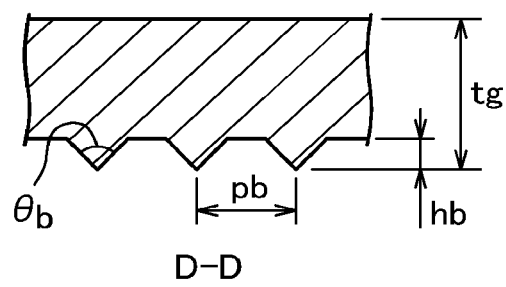
FIG. 10B is a cross sectional view of the prism array on the rear surface of the light guide.

FIG. 10A is a rear surface of the light guide 13. The prism array on the rear surface of the light guide 13 is concentric shape. FIG. 10B, which is a cross sectional view of FIG. 10A along the line D-D, shows the shape of the prism array at the rear surface of the light guide 13. In FIG. 10B, the pitch pb of the concentric prism is e.g. 0.1 micron, the height hb of the prism is 0.02 micron, and apex θb of the prism is e.g. 90 degree. The height hb of the prism formed on the rear surface of the light guide 13 is lower than the height ht of the prism formed on the main surface of the light guide 13. In FIG. 10B, the prism array is formed by projections; however, it can be formed by V shaped grooves formed on the rear surface of the light guide 13. In this case, the apex angle of the V shaped groove is e.g. 66 degree.

The pitches and heights of the prism arrays formed on both sides of the light guide 13 are substantially smaller compared with the pitches and heights of the prism array of the prism sheet 14, which is explained later. Therefore, a higher density prism array is formed on the main surface and the rear surface of the light guide 13 compared with the prism sheet 14.

Figure 11:
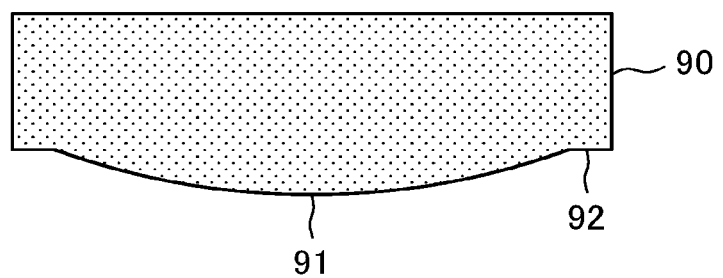
FIG. 11 is a cross sectional view of the reflection mirror.

FIG. 11 is a cross sectional view of the reflection mirror 90, which is inserted in the hole formed at the center of the light guide 13. The outer shape of the reflection mirror 90 is circle so that it can be adapted to the hole formed at the center of the light guide 13. The curved surface 91, formed on the major region of the reflection mirror 90, is made to guide the light efficiently from the LED 20 to the light guide 13. The flat portion 92 is formed at the periphery of the reflection mirror 90 to lock the mirror 90 in the hole of the light guide 13. The reflection mirror 90 can be made of e.g. a block of aluminum (Al); or the reflection mirror 90 can be made of resin coated with metal by evaporation on the curved surface 91 to form a mirror.

Figure 12:
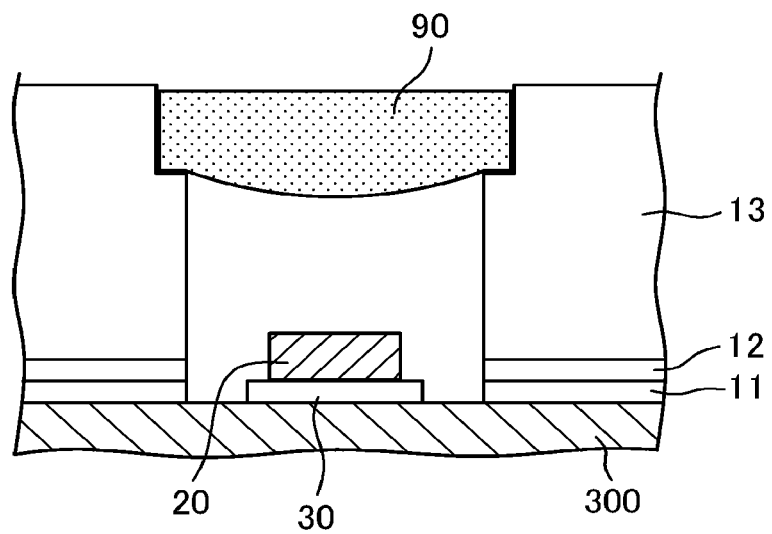
FIG. 12 is a detailed cross sectional view at the LED light source of the lighting device.

FIG. 12 is a cross sectional view of the structure, in which the reflection mirror 90 is inserted in the hole of the light guide 13. A stepped portion is formed in the hole of the light guide 13 to adapt with the flat portion 92 of the reflection mirror 90 for assembling. A space is formed between the LED 20 and the reflection mirror 90 so that the light reflected from the reflection mirror 90 can enter the light guide 13 through the side wall of the hole of the light guide 13.

Figure 13A:
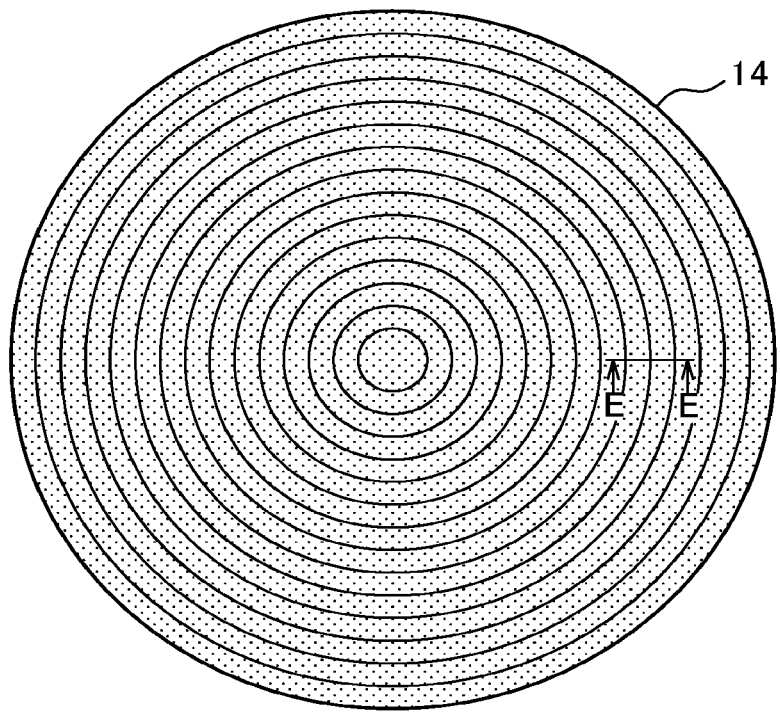
FIG. 13A is a plan view of the prism sheet.

FIG. 13A is a plan view of the prism sheet 14, which is set on the light guide 13. The prism sheet 14 is a so called a reverse prism sheet, in which the prism array is formed at the surface opposing to the light guide 13. In FIG. 13A, since the prism array is formed in concentric, all the light from the main surface of the light guide 13 can be concentrated in the normal direction to the major surface of the prism sheet 14.

Figure 13B:
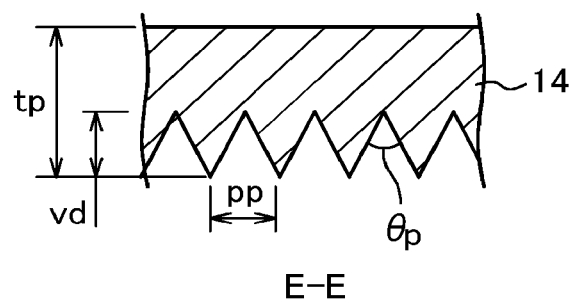
FIG. 13B is a cross sectional view of the prism array formed on the prism sheet.

FIG. 13B, which is a cross sectional view of FIG. 13A along the line E-E, shows the cross sectional view of the prism array. In FIG. 13B, a thickness tp of the prism sheet 14 is e.g. 200 micron, a depth vd of the V groove is e.g. 75 micron, an apex θp is e.g. 66 degree, and a pitch pp is e.g. 100 micron. Therefore, the height, the pitch, and so forth of the prism array of the prism sheet 14 are much bigger compared with the ones of the prism array formed on the main surface and the rear surface of the light guide 13.

As described above, a thickness of the essential part, except the heat sink, of the lighting device according to embodiment 1 can be made 10 mm or less, or even can be made 5 mm or less. In addition, the light can be collimated by prism arrays formed on the main surface and the rear surface of the light guide 13, and the prism sheet, thus, the light distribution angle can be made as small as approximately 12 degree.

Embodiment 2

Figure 14A:
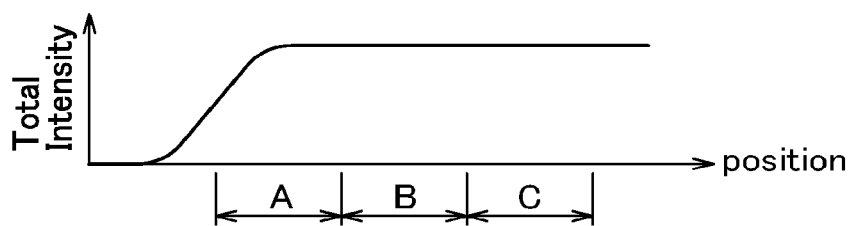
FIG. 14A is an example of illuminance distribution when the liquid crystal lens according to embodiments 2 and 3 are used.
Figure 14B:
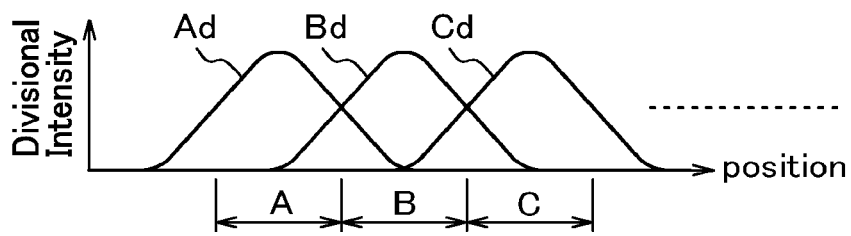
FIG. 14B is an example of illuminance distribution at the irradiated surface corresponding to each of the emitting region when a liquid crystal lens is set on each of the divided emitting region.
Figure 14C:
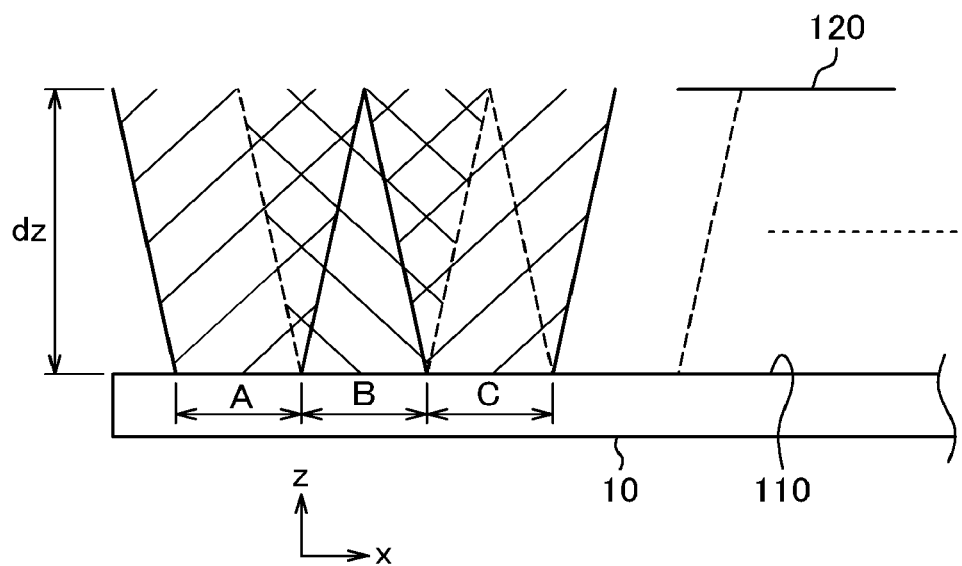
FIG. 14C is a cross sectional view in which the emitting surface is divided into regions to explain the lens action of the liquid crystal lens according to embodiments 2 and 3.

Embodiment 2 relates to the structure to control the outgoing light by setting liquid crystal lens at the emitting surface of the lighting device. FIGS. 14A through 14C are conceptual view relating to a function of the liquid crystal lens. FIG. 14C is a cross sectional view of the lighting device 10. In FIG. 14C, the emitting surface 110 is divided into the regions of A, B, C and so forth. The light having a predetermined light distribution angle is emitted from each of the regions.

FIG. 14B shows an example of illuminance at a distance dz from the emitting surface 110 in FIG. 14C. The vertical axis is an illuminance from each of areas A, B, C, and the like; Ad, Bd, Cd, and so forth are distribution of illuminance, which resembles to a normal distribution. FIG. 14A is a summation of illuminance from each of the areas depicted in FIG. 14B. The vertical axis in FIG. 14A is a summation of illuminance at the irradiated surface 120 from each of the areas at the emitting surface area 110. FIG. 14A shows the total illuminance distribution at the irradiated surface 120, a distance dz away from the emitting surface 110, is trapezoidal.

Embodiment 2 is a structure to set a liquid crystal lens at the emitting surface 110 to control the illuminance distribution at the irradiated surface 120, namely, to change the illuminance distribution Ad, Bd, Cd, and so forth in FIG. 14B at the irradiated plane 120, a distance dz away from the emitting surface 110, by changing emitting light distribution at the regions A, B, C and so forth at the emitting surface 110.

Figure 15:
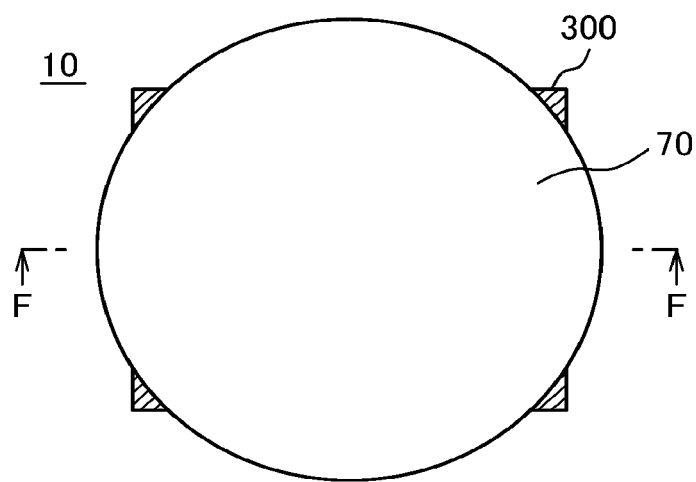
FIG. 15 is a plan view of the lighting device according to embodiment 2.
Figure 16:
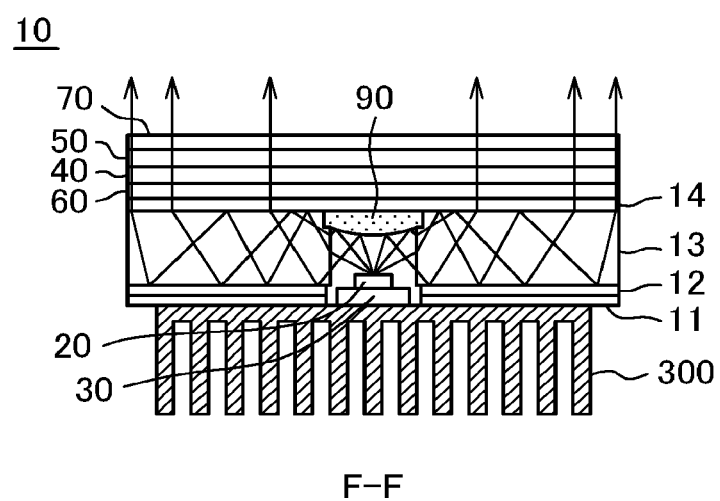
FIG. 16 is a cross sectional view of FIG. 15 along the line F-F.

FIG. 15, is a plan view of the lighting device 10 according to embodiment 2. FIG. 15 is the same as FIG. 5 of embodiment 1 except the upper polarizing plate 70 for the liquid crystal lens is set at upper most surface in FIG. 15. FIG. 16 is a cross sectional view of FIG. 15 along the line F-F. In FIG. 16, the structure from the frame 11 to prism sheet 14 is the same as FIG. 6. In FIG. 16, the lower polarizing plate 60 is set on the prism sheet 14; the lower liquid crystal lens 40 is set on the lower polarizing plate 60; the upper liquid crystal lens 50 is set on the lower liquid crystal lens 40; and the upper polarizing plate 70 is set on the upper liquid crystal lens 50.

Figure 17:
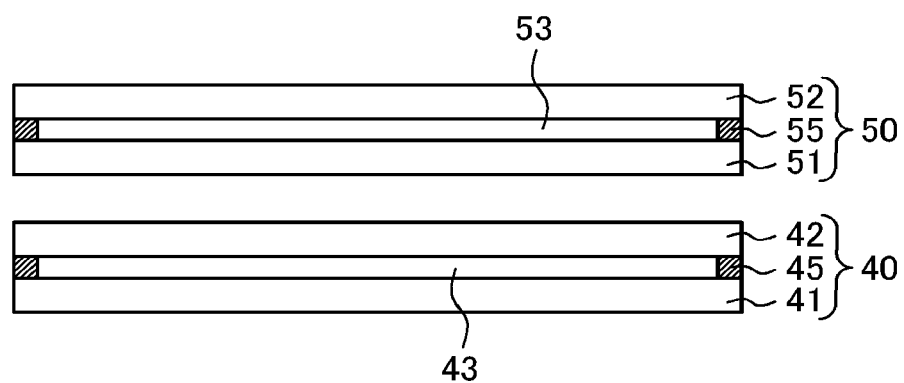
FIG. 17 is a cross sectional view of the liquid crystal lenses in FIG. 16.

FIG. 17 is a cross sectional view of the lower liquid crystal lens 40 and the upper liquid crystal lens 50. In the lower liquid crystal lens 40, the first substrate 41 and the second substrate 42 are adhered at the periphery through the seal material 45; the liquid crystal 43 is sealed inside. In the upper liquid crystal lens 50, the third substrate 51 and the fourth substrate 52 are adhered at the periphery through the seal material 55; the liquid crystal 53 is sealed inside.

Figure 18:
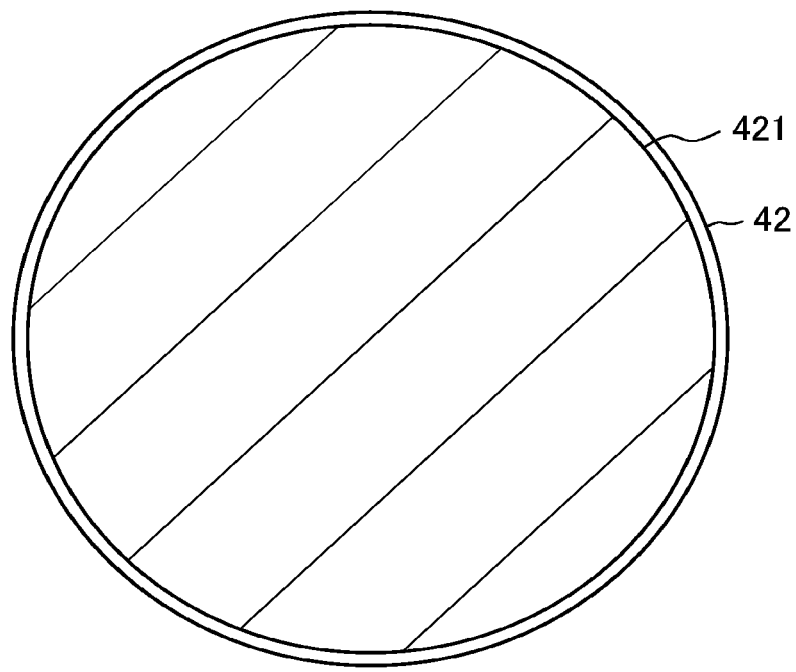
FIG. 18 is a plan view of the second substrate of the first liquid crystal lens.
Figure 19:
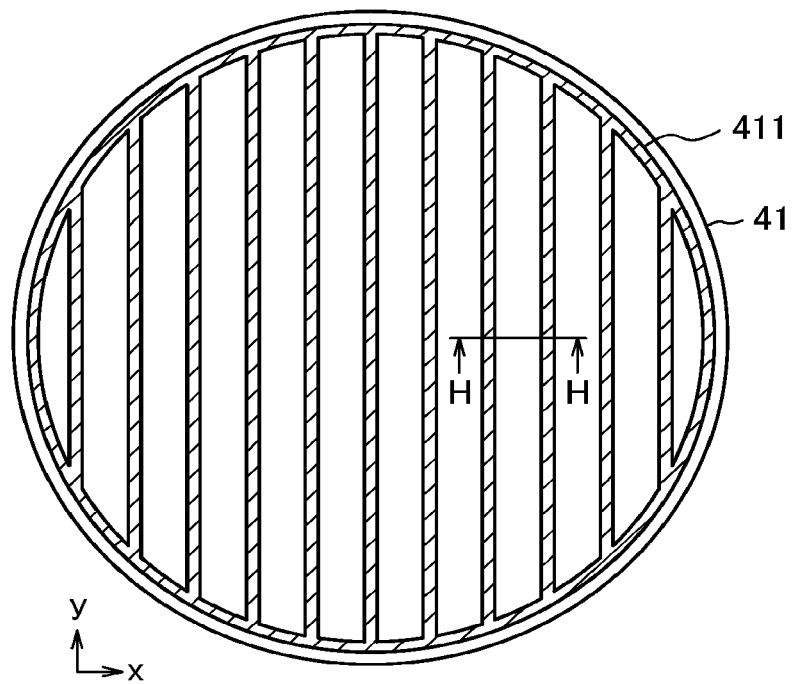
FIG. 19 is a plan view of the first substrate of the first liquid crystal lens.

FIG. 18 is a plan view of the second electrode 421 formed on the second substrate 42 of the lower liquid crystal lens 40. FIG. 19 is a plan view of the first electrode 411 formed on the first substrate 41 of the lower liquid crystal lens 40. In FIG. 19, the first electrodes 411 extend in y direction and are arranged in x direction.

Figure 20:
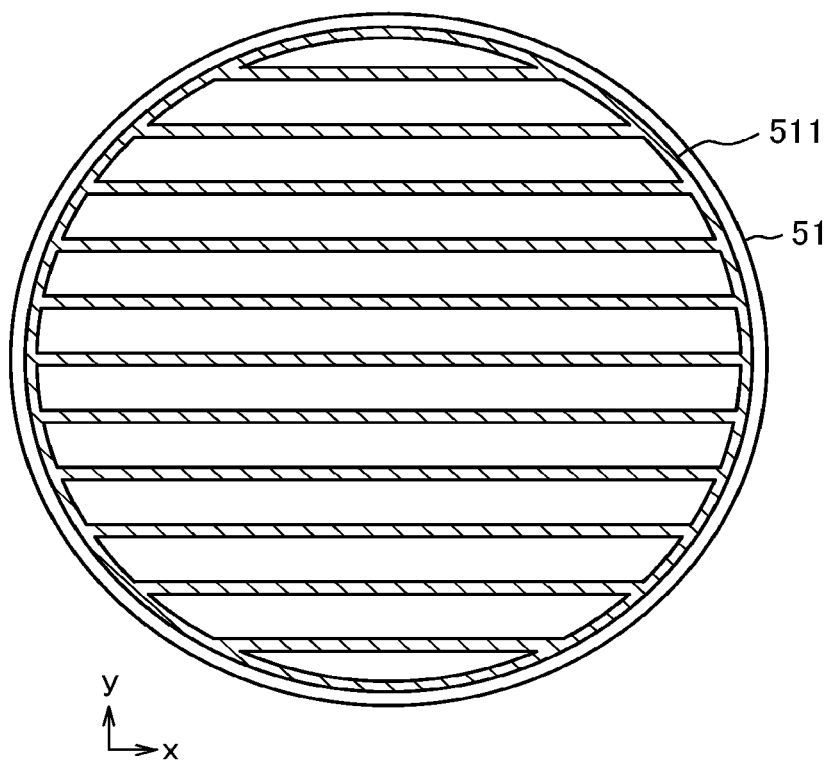
FIG. 20 is a plan view of the third substrate of the second liquid crystal lens.

FIG. 20 is a plan view of the third electrode 511 formed on the third substrate 51 of the upper liquid crystal lens 50. The third electrodes 511 extend in x direction and are arranged in y direction. The fourth electrode formed on the fourth substrate 52 is the same as the second electrode 421 of the lower liquid crystal lens 40 in FIG. 18. All the electrodes from the first electrode through the fourth electrode are made of transparent conductive film as e.g. ITO (Indium Tin Oxide).

Figure 21A:
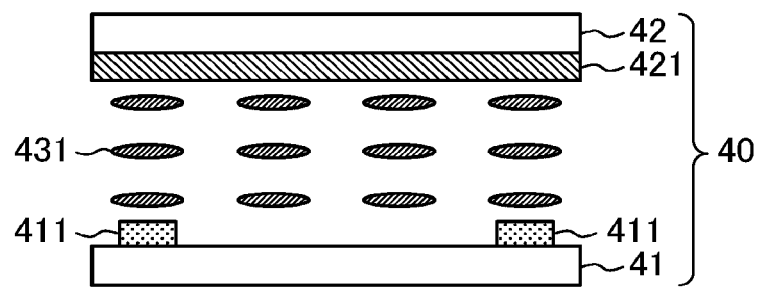
FIG. 21A is a cross sectional view in which lens action of the liquid crystal lens is shown.
Figure 21B:
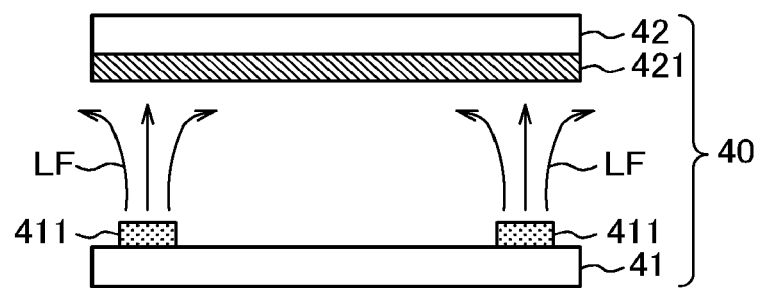
FIG. 21B is another cross sectional view in which lens action of the liquid crystal lens is shown.
Figure 21C:
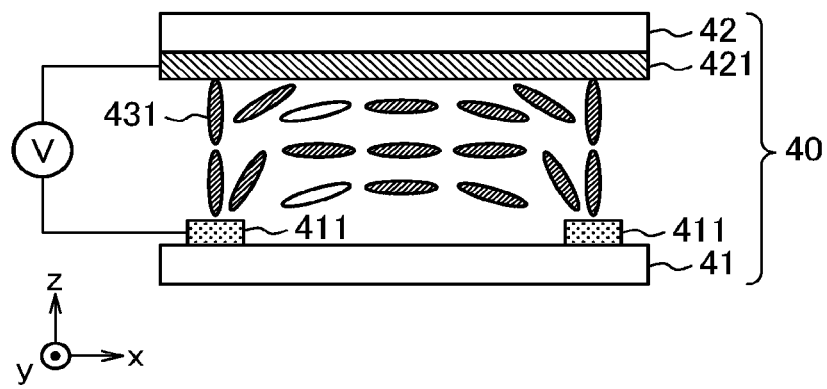
FIG. 21C is yet another cross sectional view in which lens action of the liquid crystal lens is shown.

FIGS. 21A through 21C are cross sectional views to explain function of the liquid crystal lens, which corresponds to e.g. cross sectional view along the line H-H of FIG. 19. FIG. 21A through FIG. 21C are explained for the lower liquid crystal lens 40; however, the function is the same for the upper liquid crystal lens 50. In FIG. 21A, comb shaped electrode 411 is formed on the first substrate 41 and the plane electrode 421 is formed on the second substrate 42. The liquid crystal molecules 431 are arranged parallel to the substrate if field is not applied between the electrodes.

FIG. 21B is an example of electric lines of forces LF when a voltage is applied between the comb shaped electrode 411 of the first substrate 41 and the plane electrode 421 of the second substrate 42. FIG. 21C is a cross sectional view which shows alignment of the liquid crystal molecules 431 when a voltage is applied to the first electrode 411. In FIG. 21C, the liquid crystal molecules 431 align along the lines of forces LF; consequently, the distribution in refraction is generated, thus, liquid crystal lens is formed. Such a lens is referred to as the distributed refractive index type lens GRIN (Gradient Index Lens).

Figure 22:
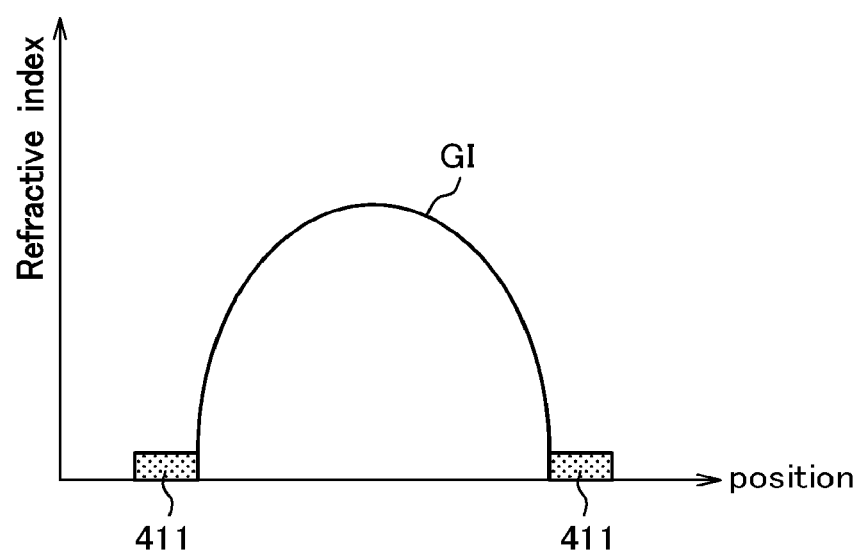
FIG. 22 is a graph that shows a lens action of the liquid crystal lens.

FIG. 22 is an example of the distributed refractive index type lens. The vertical axis of FIG. 22 is refractive index. The refractive index is minimum on the first electrode 411, which is a comb electrode; the refractive index is maximum at the intermediate position between the comb electrodes. FIG. 22 shows a normal quadratic curve; however, the distribution of the refractive index can be drastically changed by a voltage between the first electrode 411 and the second electrode 412, a distance between the comb electrodes of the first electrode 411, a thickness of the liquid crystal layer 43, and so forth. Such function is the same in the upper liquid crystal lens 50. However, the directions of the lens action are perpendicular between in the lower liquid crystal lens 40 and in the upper liquid crystal lens 50.

Figure 23:
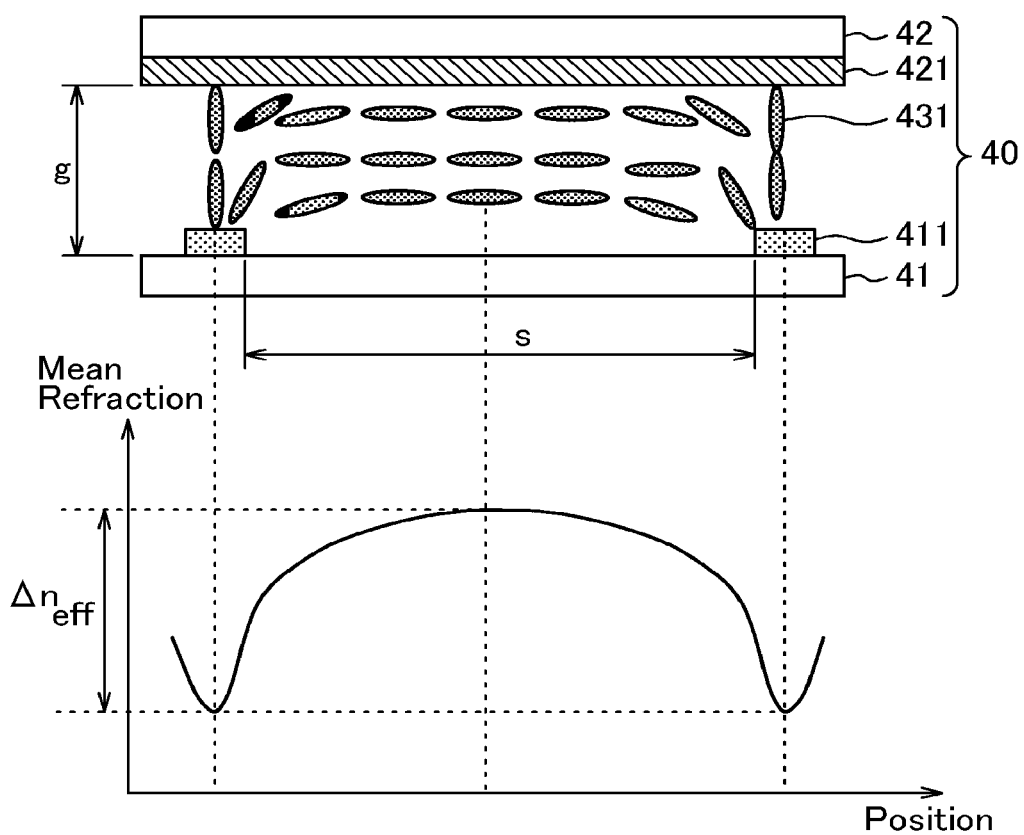
FIG. 23 is a cross sectional view of another shape of the liquid crystal lens.

A lens pitch of the liquid crystal lens is often determined by division number in the emitting surface. On the other hand, a range in thickness g of the liquid crystal layer in the liquid crystal lens is often limited. FIG. 23 is alignments of the liquid crystal molecules 431 and a distribution of the refractive index when the space s between the comb electrodes 411 is substantially larger than a thickness g of the liquid crustal layer. In FIG. 23, the vertical axis is a mean refractive index at each of the positions in the liquid crystal lens; Δneff is a difference of the refractive index in the liquid crystal lens. In the lens in FIG. 23, a lens of small radius of curvature is formed near the comb electrode 411, and a lens of large radius of curvature is formed at the intermediate position between the comb electrodes 411.

Figure 24:
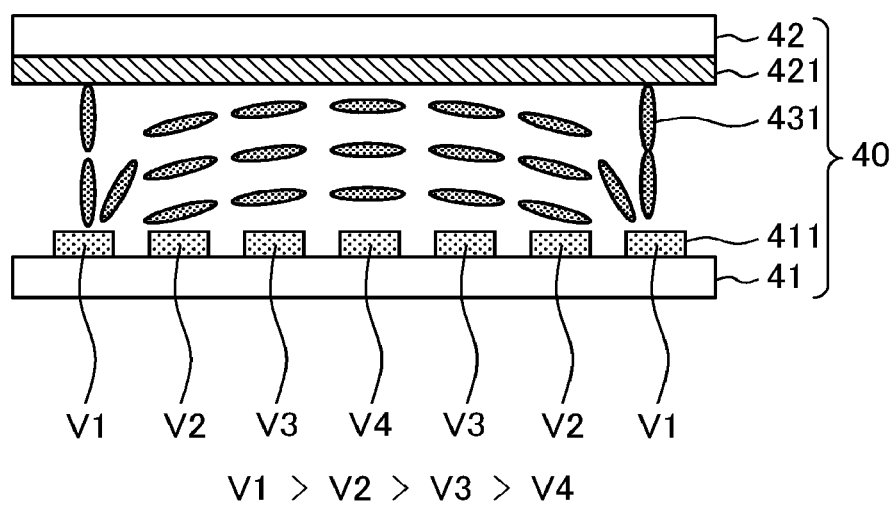
FIG. 24 is a cross sectional view of another structure of the liquid crystal lens.
Figure 25:
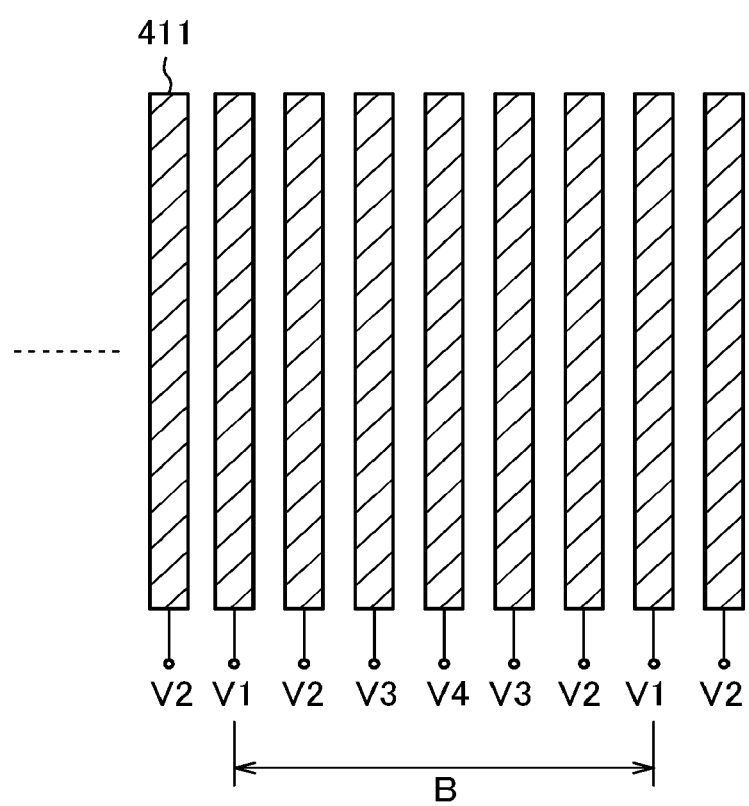
FIG. 25 is a plan view which shows voltages applied to the first electrodes.

In some cases, a lens having curvature shown FIG. 23 may be used; however, in other cases a lens having curvature of quadratic curve is needed. FIG. 24 is a cross sectional view of the liquid crystal lens, in which the lens shape is made in quadratic curve or in smooth curve without changing a pitch of the lens or a thickness of the liquid crystal layer. In FIG. 24, one lens is formed by seven electrodes 411, and different voltage is applied to each of the electrodes 411 to align the liquid crystal molecules 413 so that refractive index curve becomes a quadratic curve in the liquid crystal lens. In FIG. 24, the voltages are applied as V1>V2>V3>V4. FIG. 25 is a plan view of the comb electrodes 411 corresponding to FIG. 24. The region B in FIG. 25 corresponds to the region B in FIG. 14C.

Figure 26:
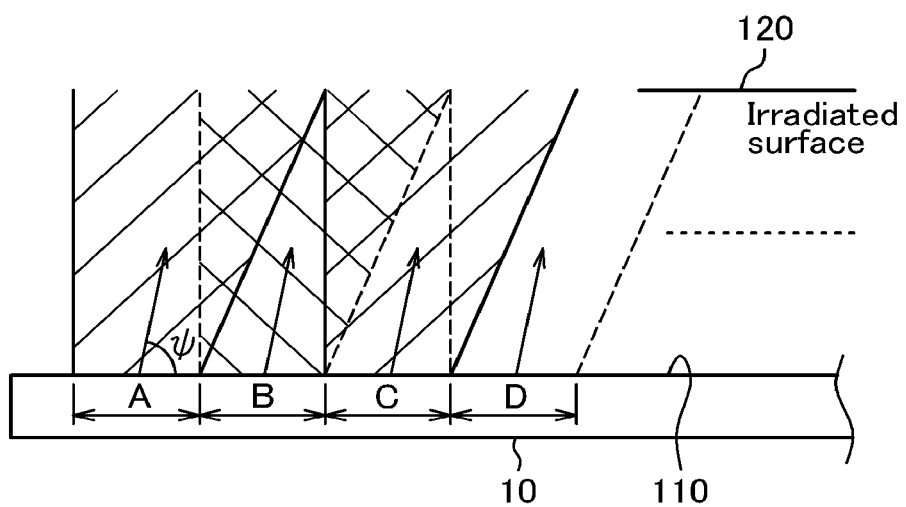
FIG. 26 is a cross sectional view that shows a function of the liquid crystal lens.

In some cases, the direction of the light is intended in a certain direction, not normal to the emitting surface 110. FIG. 26 is an example in which the light from each of the regions A, B, C, and the like is emitted in the direction of ψ to the emitting surface 110, not normal to the emitting surface 110. Such function can be attained by shaping each of the liquid crystal lenses asymmetric.

FIG. 27 is a plan view of the comb electrodes 411 in which voltages are applied asymmetrically to each of the comb electrodes 411 to make the asymmetric lens. As shown in FIG. 27, the voltages are applied as V1>V2>V3>V4, and V1>V5≠V3, and V1>V6≠V2. As a result, the liquid crystal molecules 431 are aligned to form an asymmetric lens in the cross sectional view of the liquid crystal lens as shown in FIG. 24.

Figure 28A:
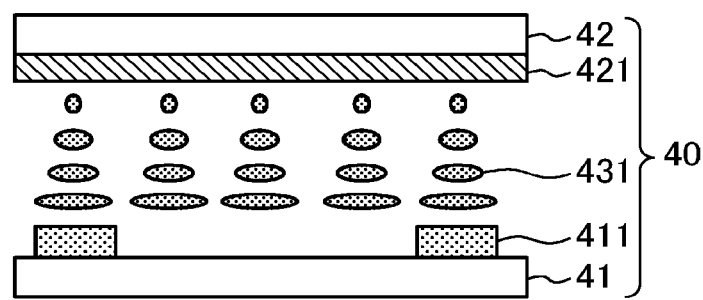
FIG. 28A is a cross sectional view of the lens action of the liquid crystal lens constituted by TN type liquid crystal.
Figure 28B:
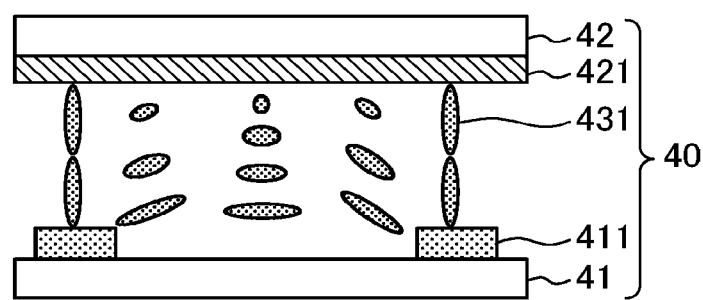
FIG. 28B is another cross sectional view of the lens action of the liquid crystal lens constituted by TN type liquid crystal.

The liquid crystal lens can be realized not only by the homogeneous alignment liquid crystal as shown in FIG. 21A or 24 but also by various other types of liquid crystal devices. FIGS. 28A and 28B are examples that the liquid crystal lens is formed by TN (Twisted Nematic) type liquid crystal. In the TN type, the liquid crystal molecules 431 rotate their alignment direction in 90 degree between the first substrate 41 and the second substrate 42.

FIG. 28A is an example in which a voltage is not applied between the first electrode 411 and the second electrode 421. In this case, the liquid crystal molecules 431 are aligned in parallel to the first substrate 41 or the second substrate 42; however, alignment direction of the liquid crystal molecules 431 changes 90 degree between near the first substrate 41 and near the second substrate 42. FIG. 28B is an example in which a voltage is applied between the first electrode 411 and the second electrode 421. In this case, the liquid crystal molecules 431 align in vertical direction to the first substrate 41 at directly above the comb electrode 411, thus, the light is shut. In the intermediate position between the comb electrodes 411, however, the liquid crystal molecules 431 are not influenced by electric field and maintain rotation of 90 degree with respect to the alignment direction near the first substrate 41; thus, transmittance is not influenced.

When the structure of FIG. 28B is evaluated as a lens, the refractive index is minimum directly above the comb electrode 411 and the refractive index is maximum at the intermediate position between the comb electrodes 411. Therefore, the distributed refractive index type lens GRIN (Gradient Index Lens) is formed. Various shapes of lenses can be realized by configuring the electrodes as in FIG. 24 or FIG. 27 even when the lens is formed by TN type liquid crystal.

Figure 29A:
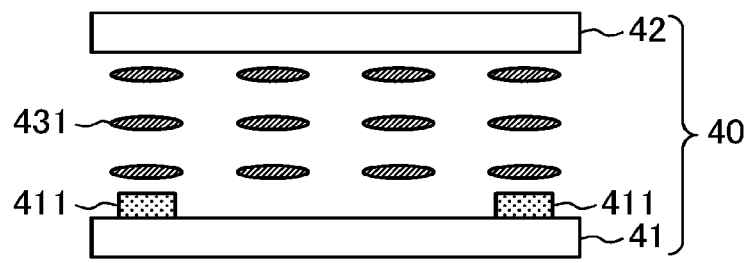
FIG. 29A is a cross sectional view in which a lens action is revealed by applying a voltage between the comb electrodes.
Figure 29B:
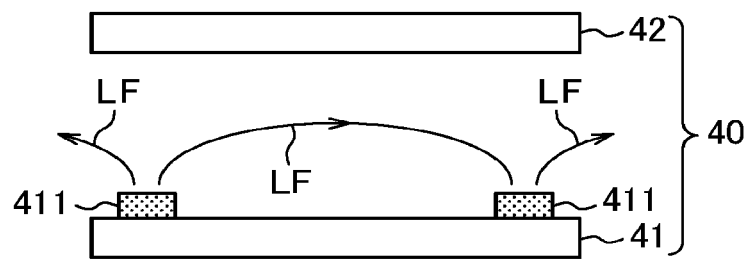
FIG. 29B is another cross sectional view in which a lens action is revealed by applying a voltage between the comb electrodes.
Figure 29C:
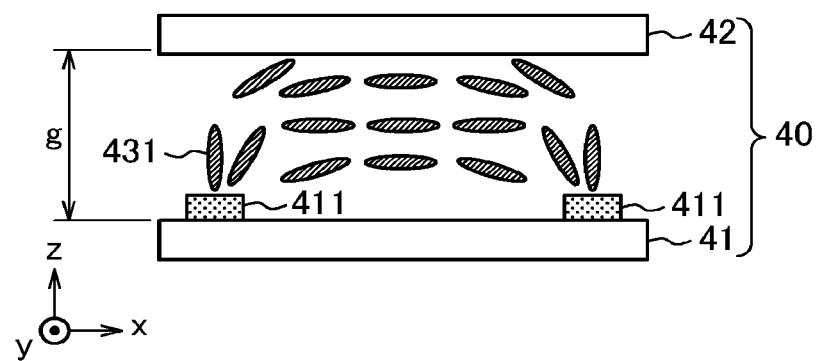
FIG. 29C is yet another cross sectional view in which a lens action is revealed by applying a voltage between the comb electrodes.

FIGS. 29A to 29C are cross sectional views in which the liquid crystal lens is formed by applying a voltage between the first electrodes 411 of comb shape. In FIG. 29A, the comb electrode 411 is formed on the first substrate 41. On the other hand, no electrode is formed on the second substrate 42. The liquid crystal lens is constituted by that the liquid crystal molecules 431 are aligned by applying a voltage between the comb electrodes, thus, the second electrode 421 is not indispensable. The second electrode 421 is formed by a transparent conductive film as ITO (Indium tin Oxide); however, even a transparent conductive film absorbs or reflects light in certain degree, thus, it is profitable from a view of transmittance of the lens if the second electrode 421 does not exist. The second electrode 421 may be formed on the second substrate 42 e.g. if the shape of the lens is intended to be changed.

FIG. 29B shows lines of forces LF generated by applying a voltage between the comb electrodes 411. The lines of forces LF are directed vertically to the substrate 41 at directly above the comb electrode 411; the lines of forces LF are directed in parallel to the substrate 41 at the intermediate position between the comb electrodes 411. The liquid crystal molecules 431 align in the lines of forces LF.

FIG. 29C is a cross sectional view in which the liquid crystal molecules 431 align in the field that is depicted in FIG. 29B. In FIG. 29C, the refractive index is minimum at directly above the comb electrode 411 and is maximum at the intermediate position between the comb electrodes 411. Therefore, in this case too, the distributed refractive index type lens GRIN (Gradient Index Lens) is formed.

Figure 30:
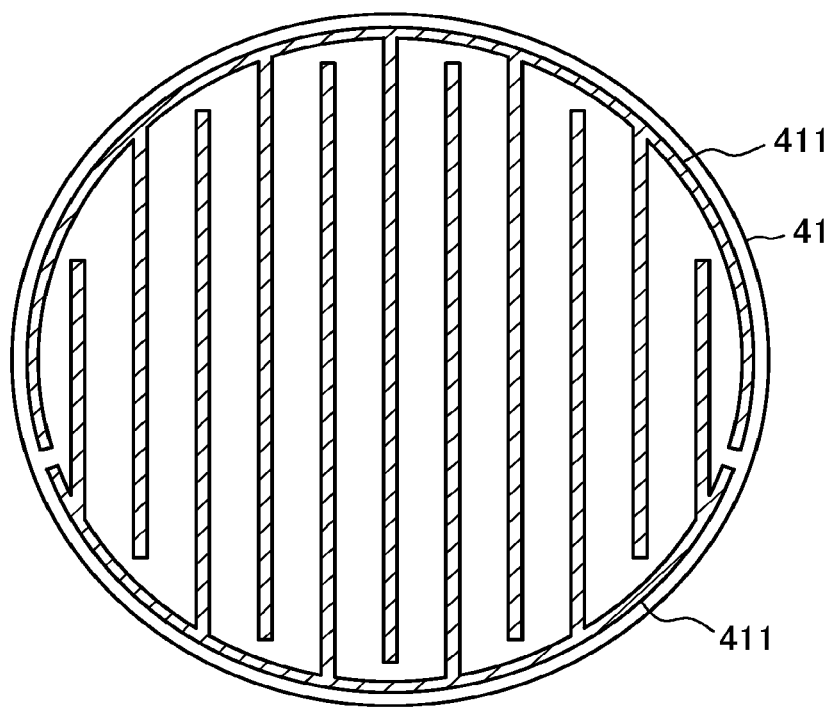
FIG. 30 is a plan view of the first electrode of the liquid crystal lens in which lens action is revealed by applying a voltage between the comb electrodes.

FIG. 30 is a plan view of the first electrode 411 formed on the first substrate 41. In FIG. 30, the first comb electrode 411 and the second comb electrode 411 are nested. The lens depicted in FIG. 29C is formed by applying a voltage between the first comb electrode 411 and the second comb electrode 411. Various liquid crystal lens can be formed by changing a thickness g of the liquid crystal layer, a distance s between the comb electrodes, and a voltage V applied between the comb electrodes.

Figure 31:
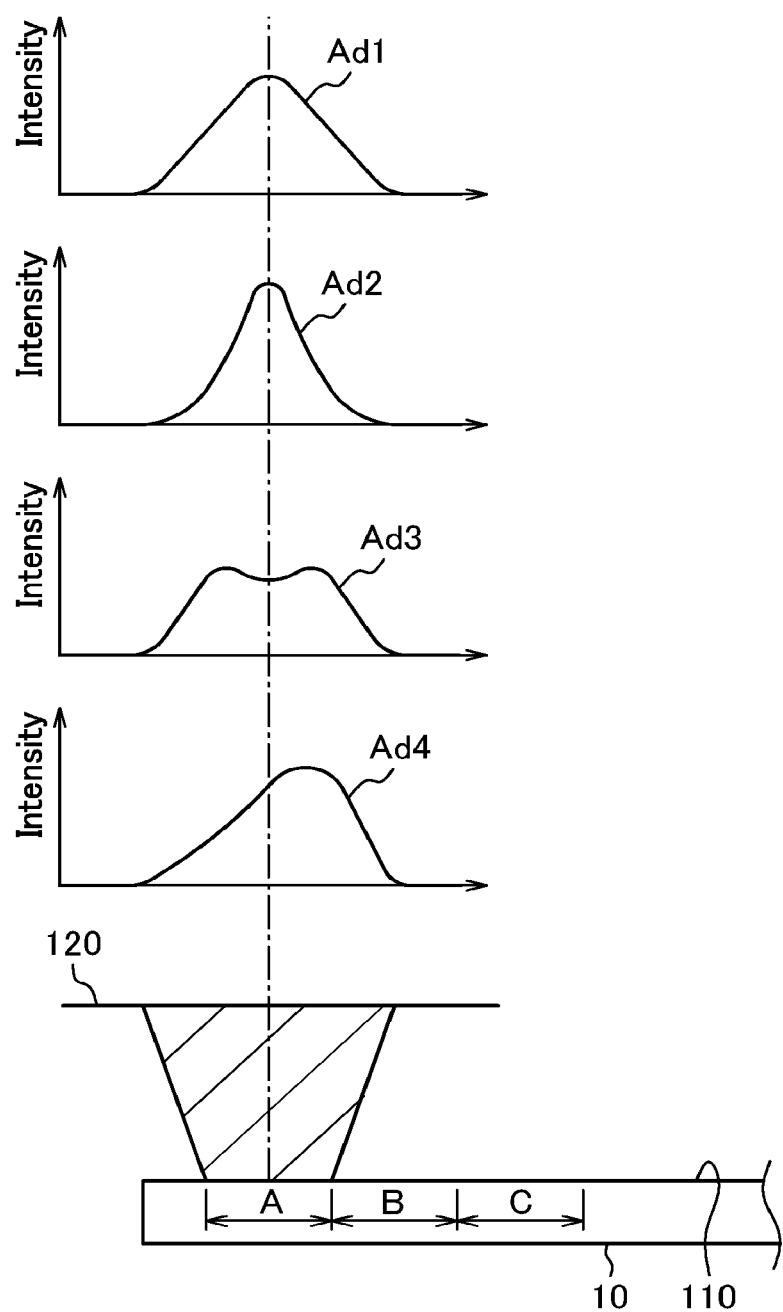
FIG. 31 is a cross sectional view of the illuminance distribution according to the liquid crystal lenses of embodiments 2 and 3.

As described above, lenses of various functions can be formed not only by changing a distance between the electrodes, a thickness of the liquid crystal layer, and an applied voltage between the electrodes, but also by the types of liquid crystal lenses. FIG. 31 shows examples to change the illuminance distribution by the liquid crystal lens. FIG. 31 is the same structure as FIG. 14B and FIG. 14C, however, only emitting light from the region A is shown. FIG. 31 shows that the distribution of the emitting light can be changed in various shapes by the liquid crystal lens set in the region A.

In FIG. 31, the illuminance distribution Ad1 resembles to the normal distribution; the illuminance distribution Ad2 also resembles to the normal distribution, however, the light is more condensed. The illuminance distribution Ad3 shows the liquid crystal lens is used as a divergence lens to acquire a trapezoidal illuminance distribution. The illuminance distribution Ad4 shows a direction of the axis of the illuminance distribution is deviated in polar angle by making the liquid crystal lens asymmetric.

As explained in FIGS. 14A to 14C, the luminance distribution on the screen is a summation of the light emitted from each of the regions of the emitting surface 110. In other words, the illuminance distribution on the irradiating surface 120 can be changed by changing the illuminance distribution from each of the regions, A, B, C, and the like in the emitting surface 110.

Embodiment 3

Figure 32:
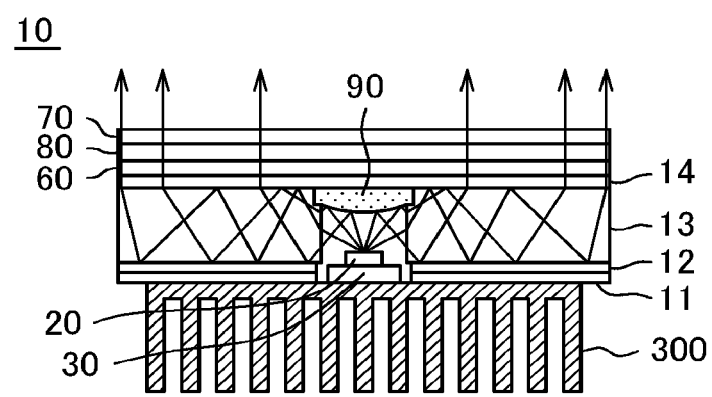
FIG. 32 is a cross sectional view of the lighting device of embodiment 3.

FIG. 32 is a cross sectional view of the lighting device according to embodiment 3. In embodiment 3, the lens action of the liquid crystal lens is in radial direction. In FIG. 32, only one liquid crystal lens 80 is used, other structures are the same as FIG. 5 or 16. The VA (Vertical alignment) type liquid crystal, namely, the homeotropic alignment liquid crystal, is used to form the liquid crystal lens 80 whose lens action is in radial direction. Rubbing process or photo alignment process to align the liquid crystal molecules 431 in a direction parallel to the alignment film is not necessary in the VA type liquid crystal.

Figure 33:
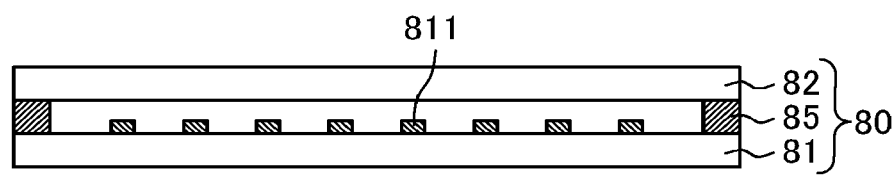
FIG. 33 is a cross sectional view of the liquid crystal lens of FIG. 32.
Figure 34:
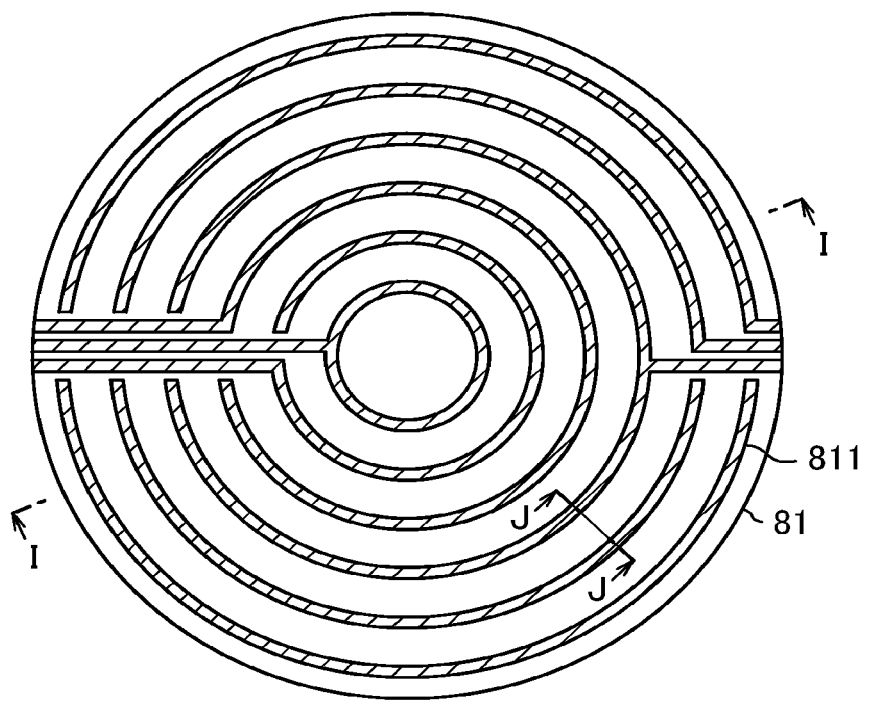
FIG. 34 is a plan view of the first substrate of the liquid crystal lens.

FIG. 33 is a cross sectional view of the liquid crystal lens 80; FIG. 34 is a plan view of the first electrode 811 formed on the first substrate 81 of the liquid crystal lens 80. FIG. 33 corresponds to the cross section of FIG. 34 along the line I-I. In the liquid crystal lens of FIG. 33, an electrode is not formed on the second substrate 82; the liquid crystal lens is formed by applying voltages between the ring shaped electrodes of the first electrode 811 formed on the first substrate 81.

Figure 35A:
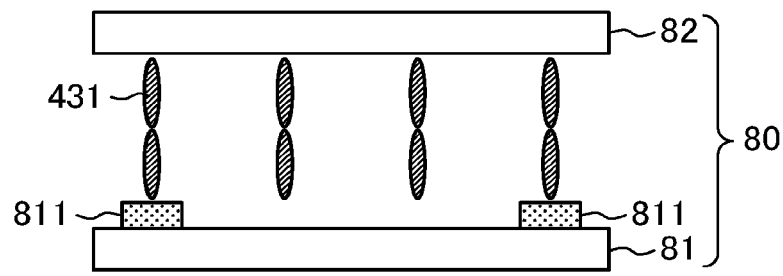
FIG. 35A is a cross sectional view of a lens action of the liquid crystal lens according to FIG. 34 along the line J-J.
Figure 35B:
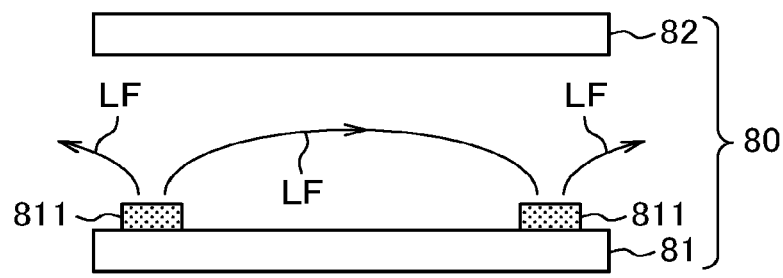
FIG. 35B is another cross sectional view of a lens action of the liquid crystal lens according to FIG. 34 along the line J-J.
Figure 35C:
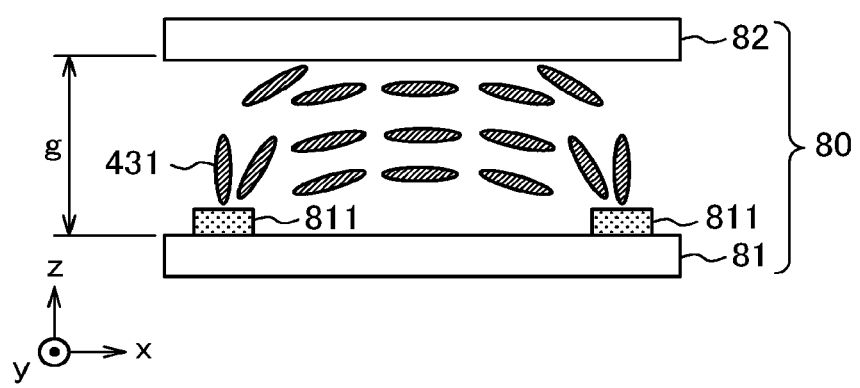
FIG. 35C is yet another cross sectional view of a lens action of the liquid crystal lens according to FIG. 34 along the line J-J.

In FIG. 34, concentrically formed plural ring shaped electrodes constitute the first electrode 811. Each of the ring shaped electrodes 811 can be applied with voltages independently. FIGS. 35A to 35C, which correspond to a cross sectional view of FIG. 34 along the line J-J, explain the lens function of embodiment 3. FIG. 35A is a cross sectional view in which a voltage is not applied to the first electrode 811. Since the liquid crystal is homeotropic in this embodiment, the liquid crystal molecules 431 align vertically to the main planes of the first substrate 81 and the second substrate 82.

FIG. 35B shows lines of forces LF when a voltage is applied between the first electrodes 811. The line of force LF is directed vertically to the substrate 81 at directly above the comb electrode 811, and is directed parallel to the substrate 81 at the intermediate position between the comb electrodes 811. The liquid crystal molecules 431 align along with the line of force LF.

FIG. 35C is a cross sectional view in which the liquid crystal molecules 431 align with the field of FIG. 35B. In FIG. 35C, the refractive index is minimum at directly above the comb electrode 811 and maximum at the intermediate position between the comb electrodes 811. Therefore, in this case too, the distributed refractive index type lens GRIN (Gradient Index Lens) is formed.

In this case, each of lenses is formed in radial direction of the ring electrodes 811 or in radial direction of the circular first substrate 81 and the circular second substrate 82.

However, the function of each of the lenses in the lighting device is the same as explained in FIGS. 14A through 14C and FIG. 31 and so forth.

Embodiment 4

Figure 36:
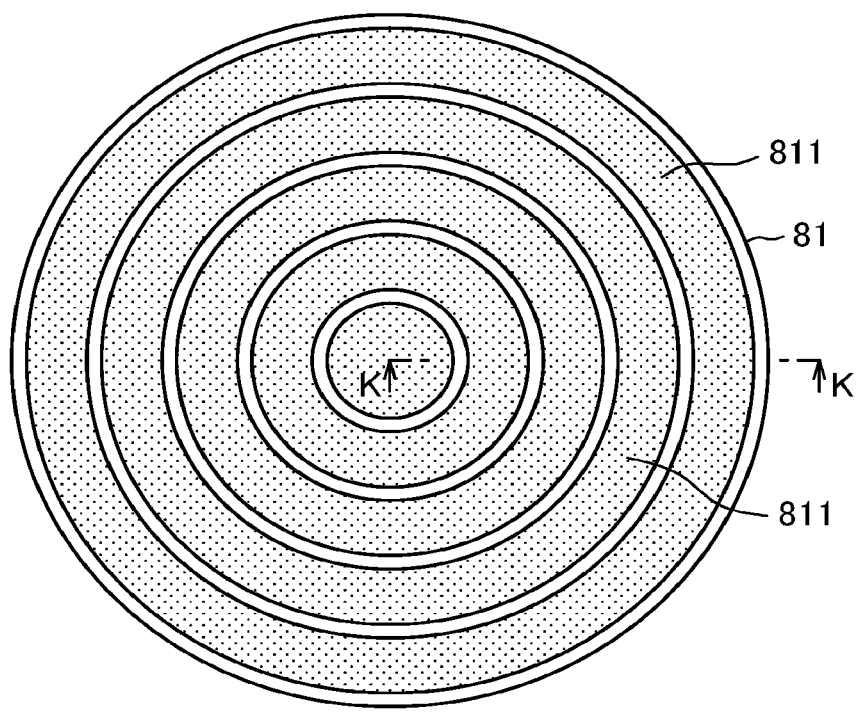
FIG. 36 is a plan view of the first substrate of the liquid crystal lens according to embodiment 4.

This embodiment relates to the structure in which one liquid crystal lens as a whole is formed in circular liquid crystal lens. FIGS. 36 through 39 show an example of this structure. In the meantime, a plan view of the lighting device of embodiment 4 is the same as FIG. 15, and a cross sectional view of the lighting device of embodiment 4 is the same as FIG. 32. Further, the lower polarizing plate 60 and upper polarizing plate 70 of FIG. 32 and so forth also can be used in embodiment 4. FIG. 36 is an example of the first electrode 811 formed on the circular first electrode 81. Plural ring shaped electrodes formed in concentric constitute the first electrode 811. The width of the ring electrode of FIG. 36 is wider than that of FIG. 34. The leader lines are omitted in FIG. 36.

Figure 37:
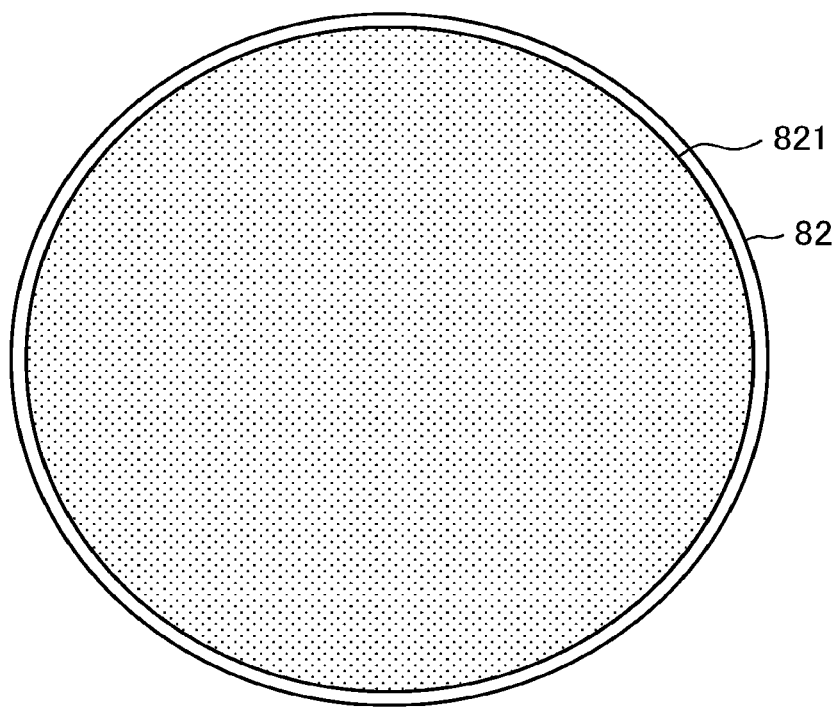
FIG. 37 is a plan view of the second substrate of the liquid crystal lens according to embodiment 4.
Figure 38:
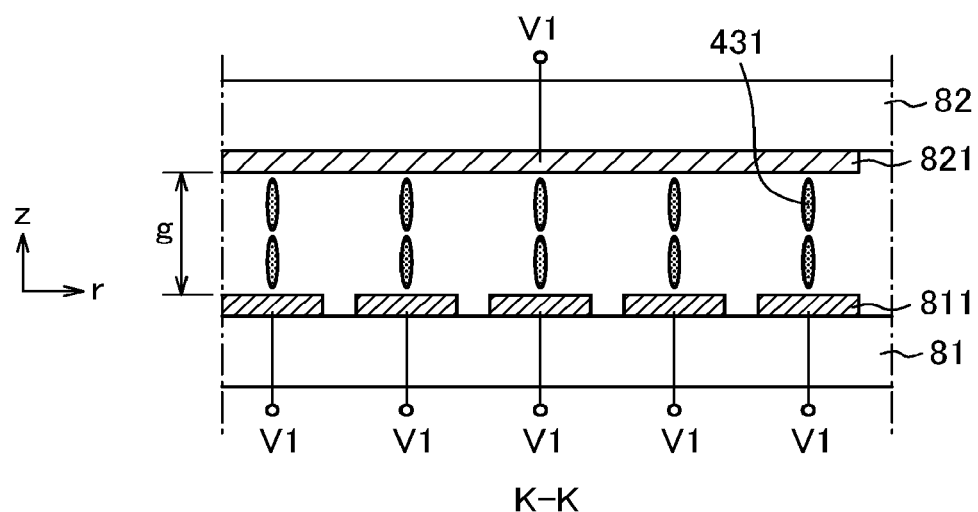
FIG. 38 is a cross sectional view which shows lens action of the liquid crystal lens of embodiment 4.
Figure 39:
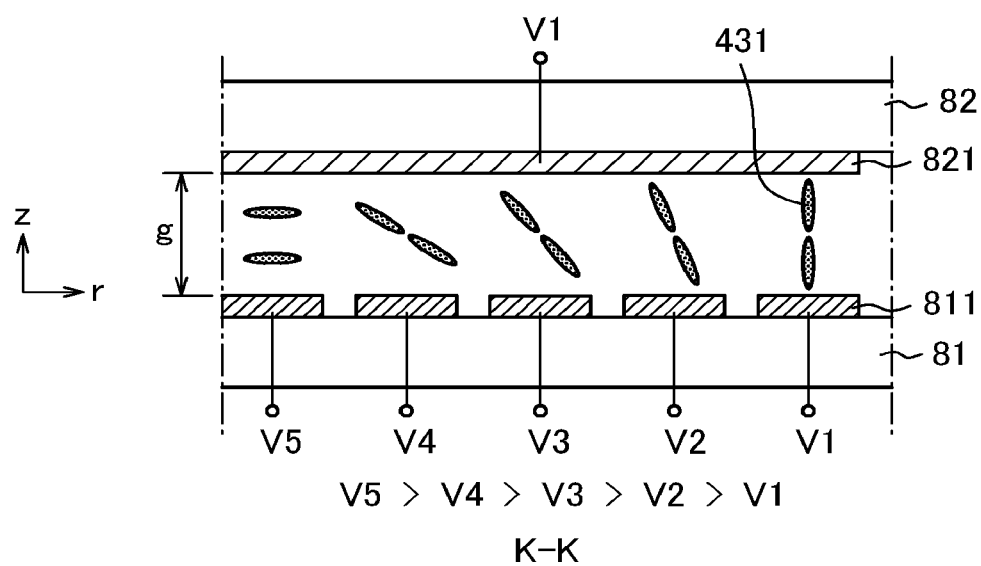
FIG. 39 is another cross sectional view which shows lens action of the liquid crystal lens of embodiment 4.

FIG. 37 is an example of the second electrode 821 formed on the circular second substrate 82. The second electrode 821 is formed in disc shape. The liquid crystal is inserted between the first substrate 81 and the second substrate 82 to constitute the liquid crystal lens. FIGS. 38 and 39 are cross sectional views after the first substrate 81 and the second substrate 82 are assembled; FIGS. 38 and 39 correspond to the cross sectional views of FIG. 36 along the line K-K.

FIG. 38 is a cross sectional view of the liquid crystal lens in which a voltage is not applied between the disc shaped second electrode 821 and the ring shaped first electrodes 811. In FIG. 38, since the liquid crystal is homeotropic type, the liquid crystal molecules 431 align vertically to the major surfaces of the first substrate 81 and the second substrate 82. In FIG. 38, r direction means a radial direction.

FIG. 39 is a cross sectional view in which different voltages are applied to the plural ring shaped first electrodes 811. In FIG. 39, the voltage applied to the second electrode 821 is V1; voltages V1, V2, V3, V4, and V5 are applied to each of the ring shaped first electrodes 811 in order from outside, and V1<V2<V3<V4<V5. The tilting of the liquid crystal molecules 431 becomes larger according to the voltage applied to the first electrode 821 becomes lager; and the liquid crystal molecules 431 align approximately parallel to the first substrate 81 at the center of the first substrate 81.

When FIG. 39 is viewed as a liquid crystal lens, refractive index at the center of the first substrate 81 is maximum where voltage V5 is applied to the first electrode 811 and the liquid crystal molecules 431 align in parallel to the first substrate 81; refractive index at the periphery is minimum where voltage V1 is applied to the first electrode 811 and the liquid crystal molecules 431 align vertically to the first substrate 81. Therefore, from the peripheral portion to the center of the liquid crystal lens, the distributed refractive index type lens GRIN (Gradient Index Lens) is formed. In the liquid crystal lens according to this embodiment, the lens characteristics can be changed according to voltages applied to the plural first electrodes 811, number of the plural electrodes 811, thickness of the liquid crystal layer and so forth.

What is claimed is:
1. A lighting device comprising:
a disc shaped light guide, having a main surface and a rear surface, including a first hole at a center,
a disc shaped reflection sheet, disposed at the rear surface side of the light guide, including a second hole at a center, a prism sheet, disposed at the main surface side of the light guide, including a concentric first prism array,
wherein a reflection mirror is set in the first hole of the light guide at a side near to the prism sheet,
an LED is set opposing to the reflection mirror,
wherein a second prism array, which extends in radial direction and arranged in circumferential direction, is formed on the main surface of the light guide,
a third prism array, which is formed concentrically, is formed on the rear surface of the light guide, and
wherein a height of the first prism array is higher than a height of the second prism array and a height of the third prism array.

2. The lighting device according to claim 1, wherein the LED is disposed in the first hole of the light guide.

3. The lighting device according to claim 1, wherein a space exists between the LED and the reflection mirror.

4. The lighting device according to claim 1, wherein the LED exists in the second hole of the reflection sheet in a plan view.

5. The lighting device according to claim 1, wherein the reflection mirror has a reflective curved surface and a flat portion around the reflective curved surface to lock the reflection mirror in the first hole of the light guide.

6. The lighting device according to claim 1, wherein the first prism array of the prism sheet is formed at a surface opposing to the light guide.

7. The lighting device according to claim 1, wherein a first liquid crystal lens having a circular outer shape is disposed on the prism sheet,
the first liquid crystal lens has plural lenses extending in a first direction and arranged in a second direction.

8. The lighting device according to claim 7, wherein a second liquid crystal lens having a circular outer shape is disposed on the first liquid crystal lens,
the second liquid crystal lens has plural lenses extending in a second direction and arranged in a first direction.

9. The lighting device according to claim 8, wherein an initial alignment of liquid crystal molecules in the first liquid crystal lens and the second liquid crystal lens is homogeneous.

10. The lighting device according to claim 1, wherein a liquid crystal lens having a circular outer shape is disposed on the prism sheet,
the liquid crystal lens has concentric plural lenses,
an initial alignment of liquid crystal molecules is homeotropic.

11. The lighting device according to claim 1, wherein a liquid crystal lens having a circular outer shape is disposed on the prism sheet,
the liquid crystal lens has a liquid crystal layer between a first substrate and a second substrate,
plural first electrodes formed in concentric are formed on the first substrate,
a disc shaped second electrode is formed in plane on the second substrate,
lens action of the liquid crystal lens is formed by applying different voltages to each of the plural first electrodes,
an intimal alignment of liquid crystal molecules in the liquid crystal layer is homeotropic.

12. The lighting device according to claim 11, wherein, a refractive index in the liquid crystal lens in the liquid crystal layer is minimum at a periphery of the liquid crystal lens,
a refractive index in the liquid crystal lens in the liquid crystal layer is maximum at a center of the liquid crystal lens.

13. A lighting device comprising:
a disc shaped light guide, having a main surface and a rear surface, including a first hole at a center,
a disc shaped reflection sheet, disposed at the rear surface side of the light guide, including a second hole at a center,
a prism sheet, disposed at the main surface side of the light guide, including a concentric first prism array,
wherein a reflection mirror is set in the first hole of the light guide at a side near to the prism sheet,
an LED is set opposing to the reflection mirror,
wherein a second prism array, which extends in radial direction and arranged in circumferential direction, is formed on the main surface of the light guide,
a third prism array, which is formed concentrically, is formed on the rear surface of the light guide, and
wherein a pitch of the first prism array is bigger than a pitch of the second prism array.

14. A lighting device comprising:
a disc shaped light guide, having a main surface and a rear surface, including a first hole at a center,
a disc shaped reflection sheet, disposed at the rear surface side of the light guide, including a second hole at a center,
a prism sheet, disposed at the main surface side of the light guide, including a concentric first prism array,
wherein a reflection mirror is set in the first hole of the light guide at a side near to the prism sheet,
an LED is set opposing to the reflection mirror,
wherein a second prism array, which extends in radial direction and arranged in circumferential direction, is formed on the main surface of the light guide,
a third prism array, which is formed concentrically, is formed on the rear surface of the light guide, and
wherein a pitch of the first prism array is bigger than a pitch of the third prism array.

* * * * *